(12) United States Patent
Arrigoni et al.

(10) Patent No.: US 8,584,446 B2
(45) Date of Patent: Nov. 19, 2013

(54) METHOD AND DEVICE FOR CONTROLLING THE REGENERATION OF A PARTICULATE FILTER

(75) Inventors: Gabriele Arrigoni, Milan (IT); Matteo Accorra', Milan (IT); Davide Fedeli, Milan (IT)

(73) Assignee: Pirelli & C. ECO Technology S.p.A., Milan (IT)

( * ) Notice: Subject to any disclaimer, the term of this patent is extended or adjusted under 35 U.S.C. 154(b) by 344 days.

(21) Appl. No.: 13/057,901

(22) PCT Filed: Aug. 8, 2008

(86) PCT No.: PCT/IT2008/000541
§ 371 (c)(1),
(2), (4) Date: Feb. 7, 2011

(87) PCT Pub. No.: WO2010/016077
PCT Pub. Date: Feb. 11, 2010

(65) Prior Publication Data
US 2011/0131951 A1     Jun. 9, 2011

(51) Int. Cl.
*F01N 3/00* (2006.01)
*F01N 3/02* (2006.01)

(52) U.S. Cl.
USPC ............... 60/295; 60/274; 60/286; 60/311

(58) Field of Classification Search
USPC ............... 60/274, 286, 295, 297, 311
See application file for complete search history.

(56) References Cited

U.S. PATENT DOCUMENTS

| | | |
|---|---|---|
| 5,319,930 A | 6/1994 | Shinzawa et al. |
| 6,422,001 B1 | 7/2002 | Sherman et al. |
| 2001/0054277 A1 * | 12/2001 | Stopler .................... 55/282.3 |
| 2004/0134187 A1 | 7/2004 | Inoue et al. |
| 2005/0235634 A1 | 10/2005 | Schulte et al. |
| 2006/0048507 A1 | 3/2006 | Tochikawa et al. |

FOREIGN PATENT DOCUMENTS

| | | |
|---|---|---|
| DE | 43 03 711 A1 | 8/1994 |
| EP | 0 349 788 A1 | 1/1990 |
| EP | 0 990 777 A1 | 4/2000 |
| EP | 1 197 642 A2 | 4/2002 |
| EP | 1 437 493 A1 | 7/2004 |

(Continued)

OTHER PUBLICATIONS

International Search Report from the European Patent Office for International Application No. PCT/IT2008/000541 (Mail date May 12, 2009).

*Primary Examiner* — Kenneth Bomberg
*Assistant Examiner* — Audrey K Bradley
(74) *Attorney, Agent, or Firm* — Finnegan, Henderson, Farabow, Garrett & Dunner, L.L.P.

(57) ABSTRACT

A method of controlling the regeneration of a particulate filter adapted to filter particulate matter present in exhaust emissions of an engine of a vehicle. The particulate filter is coupled to a heating device adapted to be activated so as to cause the heating of the particulate filter. The method includes sensing at least one operating parameter of the particulate filter, receiving sensed data relating to the at least one sensed operating parameter and conditioning the activation of the heating device based on a comparison of the received data with at least one respective threshold. The method further includes adjusting a value of the at least one threshold based on an operating condition of the vehicle, the operating condition being detected based on the received sensed data.

53 Claims, 10 Drawing Sheets

(56) References Cited

FOREIGN PATENT DOCUMENTS

| | | |
|---|---|---|
| EP | 1 582 714 A1 | 10/2005 |
| FR | 2 771 449 | 5/1999 |
| WO | WO-2006/095146 A1 | 9/2006 |
| WO | WO-2010/015428 A1 | 2/2010 |

* cited by examiner

METHOD AND DEVICE FOR CONTROLLING THE REGENERATION OF A PARTICULATE FILTER

CROSS REFERENCE TO RELATED APPLICATION

This application is a national phase application based on PCT/IT2008/000541, filed Aug. 8, 2008, the content of which is incorporated herein by reference.

FIELD OF THE INVENTION

The present invention relates to the field of the devices for filtering exhaust gas emissions. Particularly, the present invention relates to a method and device for regenerating filters of particulate emissions produced by combustion processes, like those occurring in a diesel engine.

BACKGROUND OF THE INVENTION

With the term "exhaust gas" it is intended a flue gas that is produced as a result of the combustion of fuels, such gasoline/petrol, diesel, fuel oil or coal. The ever increasing diffusion of power plants, industrial process plants, and motor vehicles in the world, has urgently led to the study of possible solutions for reducing the harmful effects of the exhaust gases on the environment and on the man.

Indeed, although the largest part of most exhaust gases is relatively harmless nitrogen, water vapor (exception made for pure-carbon fuels), and carbon dioxide (with the exception of hydrogen as fuel), a relatively small part thereof is formed by undesirable toxic substances, such as carbon monoxide, hydrocarbons, nitrogen oxides, partly unburnt fuel, and particulate matter. Generally speaking, with the term "particulate matter" (briefly referred to as "PM") it is intended solid or liquid particles suspended in a gas. In an exhaust gas, such as the exhaust gas produced by a diesel engine, the main fraction of PM is composed of very small particles, mainly consisting of impure carbon particles (in jargon, also referred to as "soot"). Because of their small size, said particles, when inhaled, may easily penetrate deep into the lungs. The rough surfaces of these particles make it easy for them to bind with other toxins in the environment, thus increasing the hazards of particle inhalation. The discharge amount of PM becomes large in a diesel engine using a gas oil as a fuel or a direct-injection type gasoline engine recently coming into wide use.

A solution for removing (or at least reducing) the PM emissions of an exhaust gas produced by fuel combustion, e.g., in a vehicle engine, provides for the use of a particulate filter. Making reference to the exhaust gas produced by a diesel engine, a particulate filter—in this case, referred to as Diesel Particulate Filter (DPF)—is a device arranged in an exhaust gas emission path of the diesel engine for receiving the exhaust gas and retain the PM included thereinto.

A conventional DPF may consist of a cylindrical body made of porous material, such as silicon carbide (SiC), with a first base (upstream side) receiving the flow of the exhaust gas produced by the engine. Such DPF has a honeycomb structure, with a plurality of exhaust gas flowing channels extending in parallel to the longitudinal direction of the cylindrical body, from the upstream side body to a downstream side, corresponding to a second base of the cylindrical opposite to the first one. These channels are alternatively plugged at either the upstream side or the downstream side to form a checker pattern. The exhaust gas (including PM) hits the first surface, and is forced to flow through the channels of the DPF that are not plugged at the upstream side. Thanks to the porosity properties of the SiC, the PM included in the exhaust gas is blocked by the walls of said channels, and remain confined in the DPF, while the rest of the exhaust gas (essentially free of PM) crosses the walls, passes into the adjacent channels and exits from the DPF, for being outputted outside the vehicle through exhaust pipes.

While disposable DPFs exist, the majority of the current DPFs are designed to be subjected to cleaning operations for removing from the DPF the PM accumulated with the use. Particularly, said cleaning operations, also known as filter regeneration operations, may provide for burning off the accumulated PM, providing heat to the accumulated PM in such a way that the latter reaches its burning temperature—which, for a PM made of carbon particles, is around 600-650° C.

According to a first method known in the art, the filter regeneration is performed in a "passive" way, with the DPF that is brought to the burning temperature of the PM by exploiting the heat of the exhaust gas itself. Since however it is very difficult to reach the burning temperature of 600-650° C. simply using the heat of the exhaust gas only, a fuel additive is mixed together with the fuel, which lowers the burning temperature of the PM of about 300° C. According to the latter method, if the temperature of the exhaust gas reaches 300-350° C. and is maintained for a certain time, the PM collected in the DPF burns for spontaneous combustion, emptying the channels thereof. However, even in presence of the fuel additive, bringing the temperature of the exhaust gas to said temperature may be quite difficult, especially for those vehicles equipped with small engines, that frequently run in urban areas at a low speed, lift trucks, operative vehicles that works for long period at the idling condition, and the like. This involves an undesired build-up of PM within the DPF, which even after few hours of operations may occlude the channels of the DPF, with a consequent power off of the vehicle. In view of these reasons, the passive filter regeneration is quite inefficient.

According to a second method known in the art, the filter regeneration is performed in an "active" way, with additional heat that is supplied to the DPF by an external source, to reach the burning temperature of the PM in an easiest way. For example, the DPF may be provided with proper heating devices, that are periodically activated to heat the exhaust gas before it enters into the channels of the DPF. Also according to this solution, the fuel can be mixed with proper fuel additives, for lowering the burning temperature of the PM and facilitating the filter regeneration. For example, the heating devices may be implemented with a spiral-shaped resistance, or with ceramic or metal glow plugs positioned in the proximity of the upstream side of the DPF. Said heating devices are controlled by a suitable control unit in such a way as to heat the exhaust gas at predetermined times for favoring the trigger of the burning of the PM included in the DPF.

The European Patent application EP 990777A1 discloses a regeneration system for an exhaust gas cleaning device disposed in an exhaust emission path of an internal combustion engine. The regeneration system comprises an exhaust gas cleaning honeycomb filter and a heating means for the filter. The filter is a checkered SiC honeycomb filter having a given cell structure, and the heating means is a heater or a glow plug when using a fuel containing fuel additive.

The European Patent application EP 1582714A1 discloses a system and a method for regenerating particulate filters. Particularly, estimated values of an amount of accumulated particulate matter on a particulate filter are obtained before initiation of a forceful regeneration operation of the particulate filter. A maximum operating time period of the regeneration operation is set based on the estimated values of the amount of accumulated particulate matter. The particulate filter is regenerated in the regeneration operation by performing post fuel injection in the diesel engine during each exhaust stroke of the diesel engine to supply fuel to the particulate filter and thereby to remove particulate matter from the particulate filter through use of combustion heat of the supplied fuel upon combustion of the supplied fuel.

SUMMARY OF THE INVENTION

The Applicant observes that methods that provide for the active filter regeneration allows performing the regeneration of the DPF automatically, even if the temperature of the exhaust gas is not so high (e.g., in case the vehicle is running in urban areas at a low speed).

However, the Applicant has observed that the known solutions for performing the particulate filter regeneration are not efficient, being expensive, energy consuming for the vehicle, and not always useful. Indeed, with the solutions already known in the art, the burning of the PM retained by the filter may be triggered when it is not really necessary, or even it may not succeed.

For example, the heating devices may be activated when the temperature of the exhaust gas is so low that the burning of the PM is not triggered. This is a great drawback, since the activation of the heating devices consumes a non-negligible electric power, that in this case is entirely wasted. Wasting the already limited vehicle battery power is highly undesirable.

Moreover, even if the temperature of the exhaust gas is sufficiently high, a periodical activation of the heating devices may trigger the burning of the PM too often, even when it is not necessary, for example because the PM included in the DPF is relatively small. This drawback is exacerbated by the fact that the periodical activation of the heating devices may shorten the operative life of the heating devices themselves.

Thus, the Applicant has observed that it would be desirable to perform the activation of the regeneration operations only when necessary, for improving the efficiency of the regeneration process without wasting the vehicle energy budget.

The Applicant has also observed that a vehicle may behave in a very different manner from other vehicles in terms of produced PM per time unit, in dependence of many factors, such as, e.g., the type of engine, the conditions of use, the traveled path, etc. A mere periodic activation of the regeneration operations thus risks to be inefficient for most vehicles, since a fixed period set in the control unit of the regeneration system does not take into account of the above mentioned differences among the vehicle behaviors.

Additionally, even considering a same vehicle, its behavior typically changes during its life, with an impact on the produced PM. The Applicant has observed that known filter regeneration systems do not contemplate the possibility of tracking, as far as the activation of the regeneration operations is concerned, the changes in the behavior of the vehicle, because they operate based on fixed parameters.

The Applicant has found that different operating conditions of a vehicle can be detected based on sensed data relating exhaust emissions of its engine. The Applicant has also found that it is possible to adjust one or more thresholds set to activate the particulate filter regeneration operations based on the detected operating conditions, preferably based on a statistical analysis of the sensed data, so as to adapt the activation of the regeneration operations to the vehicle type and/or actual use, with a positive effect on the resulting efficiency of the filter regenerations.

An aspect of the present invention relates to a method for controlling the regeneration of a particulate filter adapted to filter particulate matter present in exhaust emissions of an engine of a vehicle, wherein the particulate filter is coupled to a heating device adapted to be activated so as to cause the heating of the particulate filter.

Particularly, the method provides for sensing at least one operating parameter of the particulate filter, receiving sensed data relating to the at least one sensed operating parameter and conditioning the activation of the heating device based on a comparison of the received data with at least one respective threshold.

The method further provides for adjusting a value of said at least one threshold based on an operating condition of the vehicle, said operating condition being detected based on the received sensed data.

Another aspect of the present invention relates to a filter regeneration system for controlling regeneration of a particulate filter adapted to filter particulate matter present in exhaust emissions of an engine of a vehicle.

Particularly, the filter regeneration system comprises a control unit adapted to enable activation of a heating device of the particulate filter for causing the heating thereof, and at least one sensor in communication relationship with the control unit and adapted to be operatively coupled to the particulate filter for sensing at least one operating parameter thereof.

The control unit is adapted to receive data relating to the at least one sensed operating parameter from the at least one sensor, condition the activation of the heating device based on a comparison of the received data with at least one respective threshold, and adjust a value of said at least one threshold based on an operating condition of the vehicle, said operating condition being detected based on the received sensed data.

With the above method and/or system, the efficiency of the regeneration process of the particulate filter can be substantially improved, both in terms of power consumption and reliability.

In particular, it has been found that the proposed solution allows a better tuning of the activation of the regeneration operations, such that the heating device is activated only when the conditions for successful filter regeneration are favorable.

Thus, the occurrence of unnecessary activations of the heating device is reduced, so as to avoid excessive waste of electrical power.

Moreover, the performances of the regeneration can be dynamically and autonomously improved based on the actual vehicle condition and the actual driving condition. In particular, since the operations performed by the proposed filter regeneration method and/or system are based on threshold values that dynamically evolve based on the actual vehicle conditions and the actual driving condition instead that based on fixed threshold values, the proposed filter regeneration system may be advantageously installed in whichever type of vehicle without having to drastically modify the system itself for fitting the features of specific vehicles.

The invention, in one or more preferred aspects thereof as described in the following, provides additional advantages.

For example, according to a preferred embodiment of the present invention, said receiving sensed data comprises keeping a collection of last received data.

Moreover, said adjusting a value of said at least one threshold comprises determining said value of the at least one threshold based on a statistical analysis of the data in said collection.

Particularly, said statistical analysis is performed by obtaining a statistical distribution of the data in the collection, and the value of the at least one threshold is determined based on a predetermined percentile of said statistical distribution.

The setting of the new threshold(s) can thus advantageously be performed in a simple way, without excessive calculation complexity.

In a further embodiment, said adjusting a value of said at least one threshold can be performed by assessing a result of a filter regeneration based on the received data after the filter regeneration has occurred, and adjusting a value of said at least one threshold based on the assessed result. A fine tuning of the regeneration process can thus be performed.

According to an embodiment of the invention, said sensing at least one operating parameter comprises sensing a temperature produced by said vehicle engine.

According to a further embodiment of the invention, said sensing at least one operating parameter comprises sensing a pressure of exhaust emissions produced by said vehicle engine.

Preferably, said sensing at least one operating parameter provides for sensing both the pressure and the temperature of exhaust emissions produced by the vehicle engine.

The temperature is advantageously sensed at an exit of the exhaust emission from the particulate filter.

Moreover, the pressure is preferably sensed at an entrance of the exhaust emission into the particulate filter.

It has been found that a simple configuration in which no other parameters are sensed, further to the temperature at an exit of the exhaust emission from the particulate filter and/or the pressure at an entrance of the exhaust emission into the particulate filter, is very effective for assessing when the activation of the regeneration operations should be performed, particularly with no need of an interface to a control unit of the vehicle engine. This is advantageous, in particular, for particulate filters to be installed to vehicles in after market.

According to an embodiment of the present invention, the activation of the heating device is conditioned based on a comparison of at least one among an instantaneous temperature of exhaust emissions, an instantaneous pressure of exhaust emissions, and an average pressure of exhaust emissions in a predetermined time period, with at least one respective threshold.

In particular, the received data of the instantaneous temperature can be compared with a lower instantaneous temperature threshold and/or with a higher instantaneous temperature threshold.

According to an embodiment of the present invention, the method provides for keeping a collection of last received data of the instantaneous temperature of the exhaust emissions of said vehicle engine.

Moreover, the method provides for determining said value of at least one among the lower instantaneous temperature threshold and the higher instantaneous temperature threshold based on a statistical analysis of the data in said collection.

Preferably, said statistical analysis is performed by obtaining a statistical distribution of the data in the collection.

In an embodiment of the invention, the value of at least one among the lower instantaneous temperature threshold and the higher instantaneous temperature threshold are determined based on at least one predetermined percentile of said statistical distribution.

The setting of the lower and/or the higher instantaneous temperature threshold(s) can thus advantageously be performed in a simple way, without excessive calculation complexity.

In particular, the value of the lower instantaneous temperature threshold can be set on the basis of a first predetermined percentile of said statistical distribution.

Furthermore, the value of the higher instantaneous temperature threshold can be set on the basis of a second predetermined percentile of said statistical distribution.

According to an embodiment of the present invention, said first predetermined percentile is at least higher than a 70th percentile of a first statistical distribution of received data related to an operating condition of the vehicle being unfavorable for the regeneration of the particulate filter.

Preferably, said first predetermined percentile is at least higher than a 95th percentile of the statistical distribution.

According to an embodiment of the present invention, said second predetermined percentile is at least lower than a 45th percentile of a second statistical distribution of received data related to an operating condition of the vehicle being favorable for the regeneration of the particulate filter.

Preferably, said second predetermined percentile is at least lower than a 30th percentile.

According to an embodiment of the present invention, the value of the lower instantaneous temperature threshold is not lower than a minimum temperature required for performing the regeneration of the particulate filter.

According to a further embodiment of the present invention, the value of the higher instantaneous temperature threshold is not higher than a maximum temperature for which the regeneration of the particulate filter is self-performed without the need of the activation of the heating device.

The above mentioned minimum and maximum temperatures can be set as default threshold parameters for the instantaneous temperature at the installation of the particulate filter, to be then adjusted according to the invention.

In an alternative embodiment of the present invention, the at least one predetermined percentile is a single predetermined percentile.

In this case, the lower instantaneous temperature threshold can be set to a first value depending on the single percentile, and the higher instantaneous temperature threshold can be set to a second value depending on the single percentile.

According to an embodiment of the present invention, the first value is a first percentile of said statistical distribution depending on the single percentile.

Furthermore, said second value is a second percentile of said statistical distribution depending on the single percentile.

The use of a single percentile even more simplifies the calculation of the new threshold value(s) to be set.

In an embodiment of the present invention, said conditioning of the activation of the heating device is based on a comparison of received data of the exhaust emissions instantaneous pressure with a lower instantaneous pressure threshold.

According to an embodiment of the present invention, the proposed method provides for keeping a collection of the more recent received data of the exhaust emissions instantaneous pressure.

Moreover, the proposed method provides for determining said value of the lower instantaneous pressure threshold based on a statistical analysis of the data in said collection.

According to an embodiment of the present invention, said statistical analysis comprises obtaining a statistical distribution of the data in the collection.

In this case, a value of the lower instantaneous pressure threshold is determined based on a third predetermined percentile of said statistical distribution.

The setting of the lower instantaneous pressure threshold(s) can thus advantageously be performed in a simple way, without excessive calculation complexity.

Preferably, the third percentile is at least higher than a 90% percentile of the statistical distribution. In such way the maxima of the instantaneous pressure reached during use of the vehicle in the time period corresponding to the collected data can be easily identified. The setting of the lower instantaneous pressure threshold according to the maxima reached during actual use of the vehicle can still improve the effectiveness of the regeneration process.

According to an embodiment of the present invention, the activation of the heating device is conditioned based on a comparison of received data relating to the average pressure of the exhaust emissions in said predetermined time period with a lower average pressure threshold.

According to an embodiment of the present invention, the proposed method provides for assessing the result of a filter regeneration based on the data relating to said average pressure after the filter regeneration has occurred.

Moreover, the proposed method provides for adjusting a value of said lower average pressure threshold based on the assessed result.

Preferably, said assessing the result of a filter regeneration based on the data of the exhaust emissions average pressure includes assessing if the average pressure of the exhaust emissions in a subsequent predetermined time period after the filter regeneration is lower than the lower average pressure threshold.

According to a further embodiment of the present invention, the method provides for quantifying a number of successful regenerations and a number of unsuccessful regenerations based on assessed results of successive filter regenerations.

Moreover, the proposed method preferably provides for increasing the lower average pressure threshold by a first amount if said number of unsuccessful regenerations has reached a first predetermined limit or decreasing the lower average pressure threshold by a second amount if said number of successful regenerations has reached a second predetermined limit.

This adjustment of the lower average pressure threshold provides another fine tuning of the activation of the regeneration operations.

Preferably, the values of said first and second amounts depend on the difference between the value of the exhaust emissions average pressure after the filter regeneration and the value of the lower average pressure threshold.

According to an embodiment of the present invention, said conditioning of the activation of the heating device comprises activating the heating device if the received data of said instantaneous temperature fall in an interval defined by the lower instantaneous temperature threshold and the higher instantaneous temperature threshold.

According to a further embodiment of the present invention, said conditioning the activation of the heating device comprises activating the heating device if the received data of said instantaneous pressure are higher than the lower instantaneous pressure threshold.

According to a still further embodiment of the present invention, said conditioning the activation of the heating device comprises activating the heating device if the received data of said average pressure are higher than the lower average pressure.

Preferably, the proposed method provides for activating the heating device if all the three previous conditions are fulfilled.

These simple configurations have been found particularly effective for assessing when the activation of the regeneration operations should be performed, particularly with no need of an interface to a control unit of the vehicle engine.

According to an embodiment of the invention, said at least one sensor includes a temperature sensor for sensing a temperature produced by said vehicle engine.

According to a further embodiment of the invention, said at least one sensor includes a pressure sensor for sensing a pressure of exhaust emissions produced by said vehicle engine.

Preferably, said at least one sensor includes both a pressure sensor and a temperature sensor.

According to an embodiment of the present invention, the temperature sensor is advantageously arranged to sense the temperature of the exhaust emission at an exit from the particulate filter.

Moreover, the pressure sensor can be advantageously arranged to sense the pressure of the exhaust emission at an entrance into the particulate filter.

A still further aspect of the present invention provides a corresponding filter system for filtering particulate matter present in exhaust emissions of an engine of a vehicle.

Particularly, according to an embodiment of the present invention, the filter system includes a particulate filter coupled to the vehicle engine for receiving the exhaust emission from the vehicle engine, a heating device of the particulate and a filter regeneration system as mentioned above for controlling regeneration of the particulate filter by enabling activation of the heating device for causing the heating thereof.

According to an embodiment of the present invention, the particulate filter is a SiC filter having a honeycomb structure.

According to an embodiment of the present invention, the heating device includes glow plugs.

Preferably, said glow plugs directly contact the particulate filter.

In view of the above, the filter regeneration system of the present invention needs very few additional hardware resources to be installed on the vehicle.

Indeed, only the addition of a filter regeneration apparatus including a temperature sensor after the particulate filter, glow plugs directly contacting the particulate filter (and preferably, its input base), and an electronic control unit can be advantageously provided for the installation of the particulate filter.

Consequently, the proposed filter regeneration system may be advantageously installed in whichever vehicle type, without having to drastically modify the fabrication process of the vehicle itself. Thus, the proposed filter regeneration system is particularly adapted to be sold as an aftermarket product, i.e., as an accessory to be installed in an already operating vehicle.

BRIEF DESCRIPTION OF THE DRAWINGS

These and other features and advantages of the present invention will be best understood by reading the following detailed description of some embodiments thereof, given purely by way of a non-limitative example, to be read in conjunction with the accompanying drawings, wherein.

DETAILED DESCRIPTION

Figure 1:
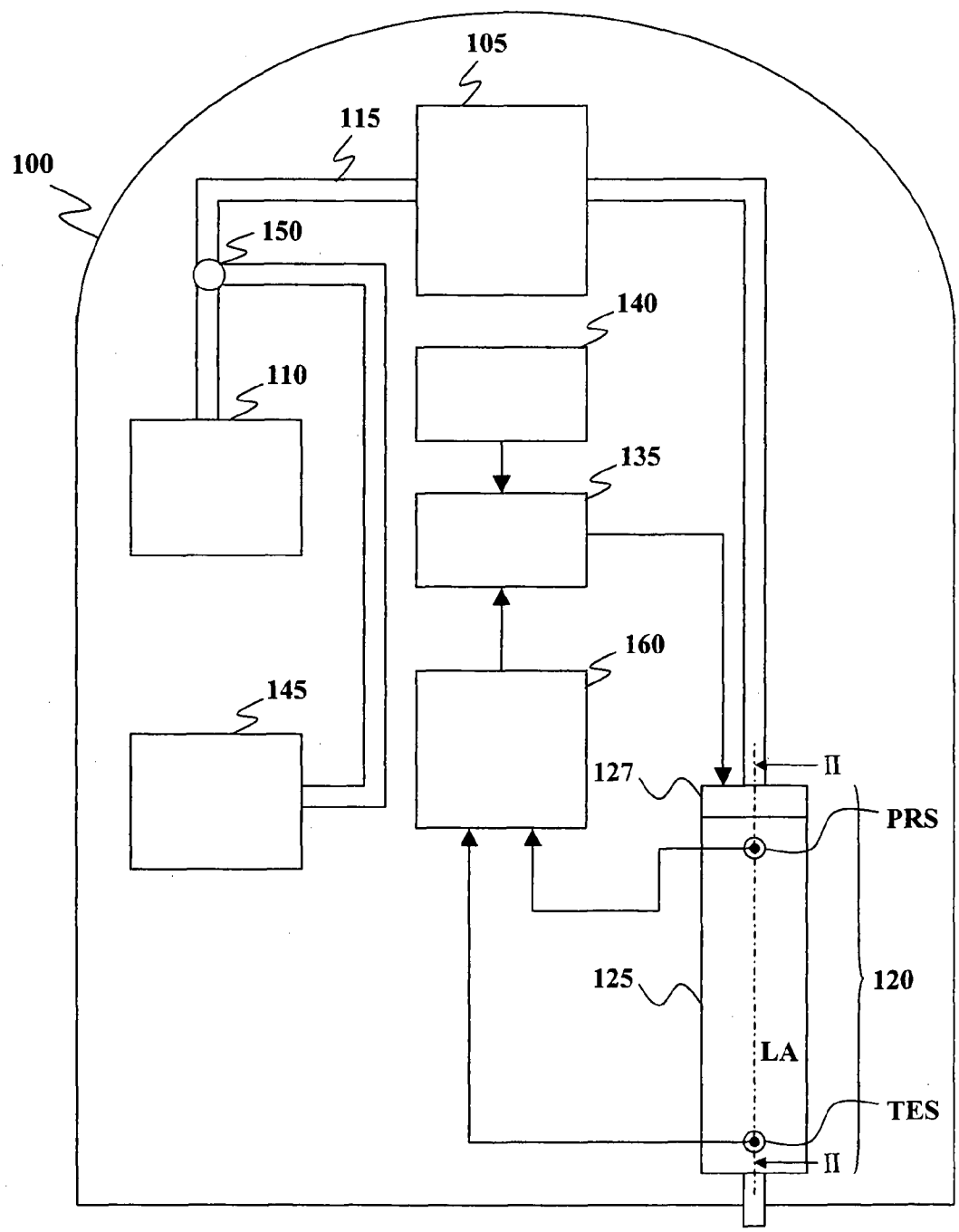
FIG. 1 is a possible application of a filter regeneration control system according to an embodiment of the present invention.

With reference to the drawings, FIG. 1 illustrates in terms of schematic blocks a possible application of a filter regeneration control system according to an embodiment of the present invention.

More particularly, in the scenario illustrated in FIG. 1, a vehicle 100, for example a car or a van, is equipped with an engine 105, for example of the diesel type, which generates kinetic energy for moving the vehicle 100. The vehicle 100 further includes a fuel tank 110 adapted to store fuel, such as gas oil; the fuel stored in the fuel tank 110 is supplied to the engine 105 through a fuel pipe 115, for being combusted in the engine 105 in order to generate the kinetic energy that causes the vehicle 100 to move.

The combustion process of the fuel occurring in the engine 105 produces exhaust gas, which is evacuated to the outside of the vehicle 100 through a car exhaust device 120; particularly, the car exhaust device 120 comprises a Diesel Particulate Filter (DPF) 125 provided with an exhaust pipe. The car exhaust device 120, and in particular the DPF 125 attenuate the acoustic emissions generated by the engine 105 of the vehicle 100; if desired, the acoustic emissions generated by the vehicle 100 may be further reduced by providing the vehicle with a muffler, arranged to receive exhaust gas from the DPF 125. The car exhaust device 120 further includes a heating device 127 contacting an input surface of the DPF 125 for locally heating portions of said input surface of the DPF 125, in order to promote the local triggering of the burning of PM in said portions of the DPF, as will be described in greater detail in the following of the present description.

As already discussed in the introduction of the present description, the purpose of the DPF 125 is to retain the PM included in the exhaust gas generated by the engine 105, in such a way that the (filtered) exhaust gas being outputted into the air, is less harmful for the human health and for the environment in general.

Figure 2:
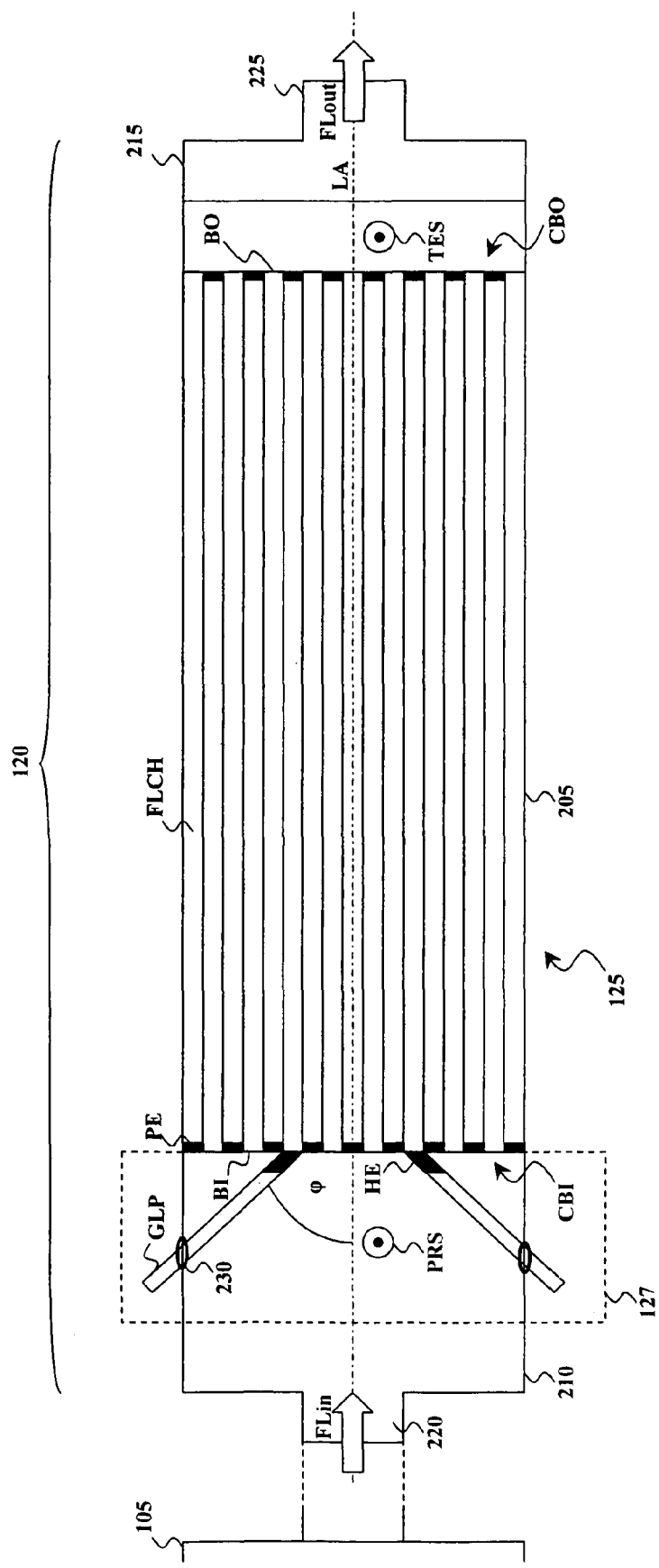
FIG. 2 illustrates a sectional view of a car exhaust device included in the system of FIG. 1.

A more detailed description of the car exhaust device 120 according to an embodiment of the present invention will be now provided with reference to FIG. 2. Particularly, FIG. 2 illustrates a sectional view of the car exhaust device 120 taken along a direction parallel to a longitudinal axis LA of the car exhaust device 120.

The DPF 125 comprises a generically cylindrical body made of porous material, such as silicon carbide (SiC), with a first base BI (also referred to as "input base") receiving the flow of the exhaust gas—denoted in the figure with the reference FLin—produced by the engine 105. The DPF 125 has a honeycomb structure, with a plurality of exhaust gas flowing channels FLCH extending in parallel to the longitudinal direction of the cylindrical body from the input base BI to a second base BO ("output base") of the cylindrical body opposite to the input one. The exhaust gas flowing channels FLCH are alternatively plugged at either the input base BI or the output base BO by means of respective closure elements PE to form a checker pattern.

Without entering into details known to those skilled in the art, a SiC DPF having a honeycomb structure can be obtained starting from a SiC paste in the following way. Briefly, a number of DPF portions having the length of the desired final DPF are firstly formed by means of extrusion operations performed on the SiC paste; during this step, also the various exhaust gas flowing channels FLCH are generated through extrusion. At this point, one end of each exhaust gas flowing channel FLCH of each DPF portion is plugged. Finally, the various DPF portions are cemented to each other, in order to form the DPF 125. It has to be appreciated that a DPF obtained with such method presents on both its bases cementing lines (not illustrated in the figure) between each pair of adjacent DPF portions that has been cemented to form the final DPF. For example, in case the DPF 125 has been obtained starting from four DPF portions, the bases of the final DPF will present four different sections, delimited by respective cementing lines. It has to be appreciated that the presence of more than one portion cemented to each other allow to obtain a more stable and resistant structure with respect to the case of a monolithic DPF.

The DPF 125 is inserted (in jargon, "canned") into a protective container 205, for example a metallic (e.g., made of stainless steel) cylinder. The protective container 205 has an input aperture CBI corresponding to the input base BI of the DPF 125 and an output aperture CBO corresponding to the output base BO of the DPF 125. An input lid structure 210 is connected to the protective container 205 for covering the input aperture CBI, while an output lid structure 215 is connected to the protective container 205 for covering the output aperture CBO. The input lid structure 210 is provided with a pipe union member 220 adapted to receive the flow FLin of the exhaust gas produced by the engine 105.

In operation, the car exhaust device 120 receives exhaust gas from the engine 105. The flow FLin of the exhaust gas is collected by the pipe union member 220 of the input lid structure 210, and is conveyed toward the input base BI of the DPF 125. In this way, the exhaust gas is forced to flow through those exhaust gas flowing channels FLCH that are not plugged at the input base BI, until reaching the plug elements PE. As a consequence, since said exhaust gas flowing channels FLCH are blocked by the plug elements PE, the exhaust gas is forced to cross the later walls, so as to reach the adjacent exhaust gas flowing channels FLCH—which are not plugged at the output base BO—and exit from the DPF 125. Particularly, thanks to the porosity properties of the SiC forming the walls of the gas flowing channels FLCH, the PM included in the exhaust gas remains confined in the DPF 125, while the (filtered) exhaust gas crosses said walls and flows through the channels FLCH that are not plugged at the output base BO. The exhaust gas exiting the output base BO forms an output flow of (filtered) exhaust gas—denoted in the figure with the reference Flout—which is evacuated, through a pipe union member 225 on the output lid structure 215, to the output of the vehicle 100.

The heating device 127 for heating the flow FLin of the exhaust gas generated by the engine 105 comprises at least one, preferably a plurality of glow plugs GLP, for example including a glow plug GLP for each section of the input base BI. Each glow plug GLP has an end that is provided with a heating element HE capable of reaching temperatures of the order of 900-1000° C. when electrified due to electrical resistance.

According to an embodiment of the present invention, the glow plugs GLP forming the heating device 127 are positioned in the input lid structure 210 in such a way that the heating elements HE are in physical contact with, i.e., in abutment to, the (corresponding section of the) input base BI of the DPF 125. Particularly, the input lid structure 210 is provided with threaded bushings 230 adapted to accommodate the glow plugs GLP with an angle φ with respect to the longitudinal axis LA of the DPF 125, so as not to obstacle the flow FLin of exhaust gas. In order to improve the efficiency of the filter regeneration process obtainable with the proposed structure, the glow plugs GLP are screwed in the respective threaded bushings 230 to an extent such that the heating element HE of each glow plug GLP results in contact with the surface of the input base BI in any operative condition.

In order to be activated for promoting the triggering of the burning of PM in the DPF 125, the glow plugs GLP needs to be properly supplied with electrical power. For this purpose, the vehicle 100 further comprises a supply block 135 including relays supplied in turn by a vehicle battery 140, as illustrated in FIG. 1.

The car exhaust device 120 is provided with sensors adapted to monitor some physical quantities related to the condition of the DPF 125 and the exhaust gas flowing therethrough.

Particularly, a pressure sensor PRS is positioned within the input lid structure 210, in the proximity of the input base BI of the DPF 125. As will be described in greater detail in the following of the present description, the pressure sensor PRS allows to obtain useful information regarding the PM accumulated in the DPF 125, based on the measurement of the "counter-pressure" generated by the flow FLin of exhaust gas when passing through the DPF 125.

Moreover, a temperature sensor TES, such as a thermocouple or a thermistor, is positioned within the output lid structure 215, in the proximity of the output base BO of the DPF 125. As will be described in greater detail in the following of the present description, the temperature sensor TES allows to obtain useful information regarding the temperature of the DPF 125 based on the temperature of the flow FLout outputted by the DPF 125.

Referring back to FIG. 1, the vehicle 100 further includes an additive tank 145, which is used to store a fuel additive adapted to be mixed with the fuel in such a way as to alter some of its chemical/physical attributes; particularly, as already explained in the introduction of the description, the fuel additive is mixed with the fuel for lowering the burning temperature of the PM included in the gas exhaust generated by the combustion of the fuel. For this purpose, the fuel additive is injected into the fuel pipe 115 by means of a clutch 150 connected to a pipe coming from the additive tank 145.

The operations performed by the filter regeneration control system according to an embodiment of the present invention are managed by an electronic control unit, globally denoted in FIG. 1 with the reference 160. The control unit 160 is coupled with the car exhaust device 120, and in particular with the pressure sensor PRS and the temperature sensor TES. As will be described in the following of the present description, the control unit 160 processes the information received from the sensors PRS, TES, and as a result of said processing determines when the heating device 127 has to be turned on for favoring the triggering of the filter regeneration process in an efficient way, and accordingly drives the supply block 135 for activating the glow plugs GLP.

Figure 3:
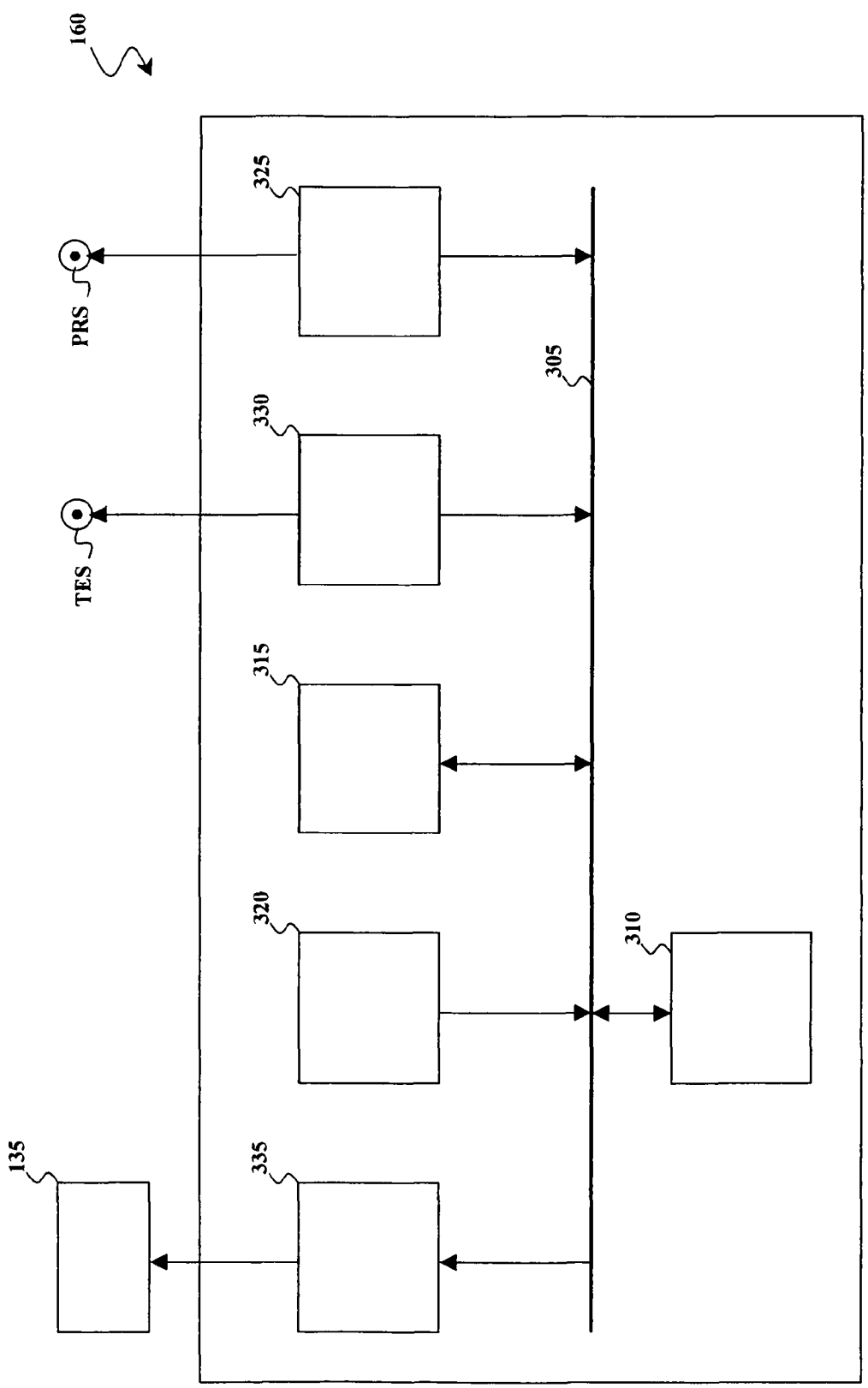
FIG. 3 illustrates an exemplary structure of a control unit included in the system of FIG. 1.

In FIG. 3, an exemplary structure of the control unit 160 is schematically shown in terms of functional blocks. Several functional units are connected in parallel to a data communication bus 305. In particular, a processing unit 310, typically comprising a microprocessor or a microcontroller or any other suitable data processing unit, controls the operation of control unit 160; a working memory 315, for example volatile registers, is directly exploited by the processing unit 310 for the execution of programs and for temporary storage of data, and a Read Only Memory (ROM) 320 stores a basic program for the bootstrap of the control unit 160, as well as other relevant data to be preserved when the control unit 160 is off. The control unit 160 is coupled with the pressure sensor PRS and the temperature sensor TES through respective circuit interfaces 325, 330, which include conditioning circuits (such as sample-and-hold circuits, A/D converters, amplifiers, buffers and the like) adapted to treat the signals generated by the sensors PRS, TES for making them interpretable by the processing unit 310. Using specific algorithms and performing operations (such as calculation of mean values of certain physical quantities) that will be described in the following of the present description, the processing unit 310 processes data received from the sensors PRS, TES, and accordingly drives the supply block 135 for activating the glow plugs GLP for a predetermined amount of time through a supply driver circuit 335.

It is pointed out that some of the components shown in FIG. 3 may be absent in some specific types of control units, and/or additional units may be provided, depending on the specific implementation of the present invention.

According to an embodiment of the present invention, the filter regeneration process (and, in particular, the timing of the glow plugs GLP activation) is managed in a more efficient way exploiting information parameters deducible from the physical quantities (pressure, temperature) monitored by the pressure sensor PRS and the temperature sensor TES.

Particularly, a first useful parameter obtainable from physical quantity monitored by the pressure sensor PRS is the load of PM that has accumulated in the DPF 125 during the use of the vehicle. The higher the PM load, the higher the counter-pressure generated by the flow FLin of exhaust gas when passing through the DPF 125, because of the obstruction of the gas flowing channels FLCH. Thus, based on said information, it is possible to derive an estimation of how much the DPF is loaded of PM, and to derive an indication of whether or not the regeneration is needed. Moreover, it has to be appreciated that the higher the load of PM in the DPF 125, the higher the combustible material available within the filter to be burned during the regeneration. Thus, the triggering of the regeneration process may be also favored by a DPF 125 that is highly loaded. An efficient way to quantify the PM load accumulated in the DPF 125 provides for calculating the average value of the counter-pressure values sensed by the pressure sensor PRS, hereinafter referred to as PRm; the average pressure value is calculated over a number NS of samples of the pressure values sensed by the pressure sensor PRS. For this purpose, the interface 325 of the control unit 160 may sample the value monitored by the pressure sensor PRS at a specific sample rate, e.g., every ten seconds, storing the sampled values into the working memory 315, so as to create a log of pressure values, including a number NS of samples, which may depend on the storage capability of the working memory 315; for example, the number NS of samples in the pressure values log may be 200. The average counter pressure PRm is then calculated by the processing unit 310 using the pressure values in the sample log.

Another useful parameter is the DPF temperature. The temperature of the DPF 125 depends on the temperature of the exhaust gas, the flow rate thereof and the thermal inertia of the DPF itself. As a result of several experimental proofs, even in presence of glow plugs GLP that heat localized portions of the DPF 125, the Applicant has observed that the remaining portions of the DPF 125 need to be at a temperature at least higher than a lower threshold temperature Tlow (of the order of 150° C.), otherwise the regeneration process (i.e., the burning of the PM) would not be triggered in a sufficient way. Particularly, if the DPF 125 is at temperatures lower than Tlow, even if the glow plugs GLP were be successful in triggering the burning of the PM accumulated near the glow plugs GLP, the combustion of the PM would not propagate toward the rest of the DPF 125, even in presence of an additive in the fuel. The higher the DPF temperature with respect to the lower threshold temperature Tlow, the more likely is that the combustion of the PM propagates through the whole DPF 125. Since a DPF made of SiC has a high thermal inertia, a good way for obtaining a stable measure of the DPF temperature consists in monitoring the temperature of the flow FLout—hereinafter referred to as Tfl—outputted by the DPF itself. In this way, the monitored temperature Tfl results to be essentially independent from any undesired rapid fluctuations introduced by any external factor (unlike the temperature of the flow Flin, which varies quickly); in other words, thanks to the thermal inertia of the DPF 125, the control unit 160 does not have to perform any average operation, being sufficient to store in the working memory 315 and continuously updating a sample of the temperature value Tfl provided by the interface 330 coupled with the temperature sensor TES.

Based on the pressure values sensed by the pressure sensor PRS it is also possible to derive an indication of the flow rate of the exhaust gas. The flow rate of the exhaust gas, and particularly that of the flow FLin at the input of the DPF 125 depends on the load of the engine 105 and on its Revolutions-Per-Minute (RPM), which depend in turn on the current driving condition of the vehicle 100. The flow rate of the flow Flin negatively affects the triggering of the combustion of the PM and that of the regeneration process, since the higher the flow rate of the flow Flin, the more heat is removed from the DPF 125. The flow rate of the flow Flin can be monitored based on the instantaneous value PRi of the counter-pressure generated by the flow Flin, which directly depends thereon. Similarly to the case of the temperature Tfl, the instantaneous value of the pressure PRi is stored in the working memory 315 of the control unit 160, and is continuously updated as new sample values are received from the pressure sensor PRS through the interface 325.

As better described later, according to an embodiment of the present invention the regeneration process of the DPF 125 is managed in an efficient way taking into account the values of the three parameters previously introduced, i.e., the average pressure PRm, the instantaneous pressure PRi and the instantaneous temperature Tfl. More particularly, according to an embodiment of the present invention, the activation of the heating device 127 (i.e., of the glow plugs GLP) is conditioned to the fact that the values of the parameters PRm, PRi and Tfl fall in respective ranges, as described in the following.

Figure 4:
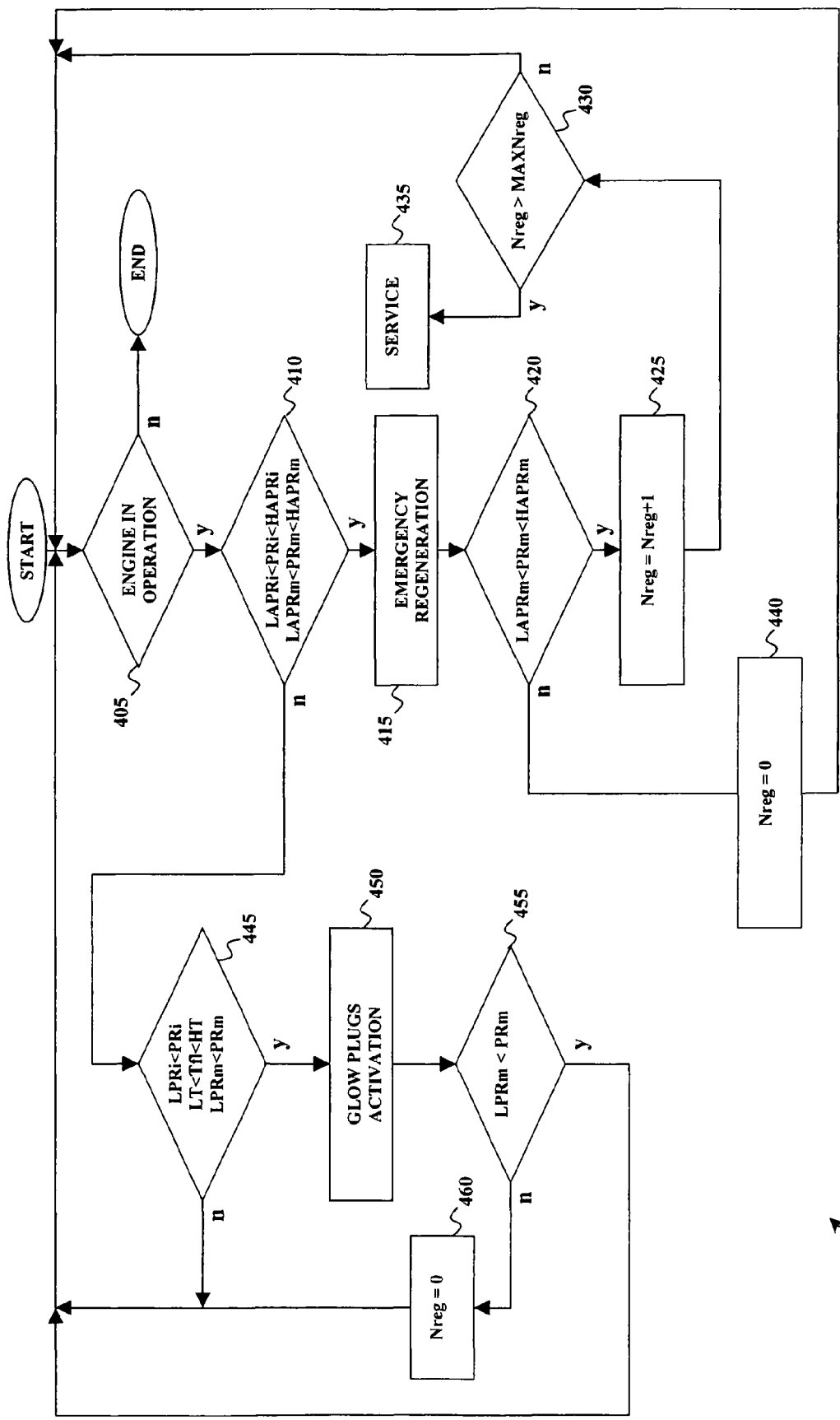
FIG. 4 depicts a flow chart illustrating the main operations performed by the filter regeneration control system of FIG. 1.

More particularly, FIG. 4 depicts a flow chart 400 illustrating the main operations performed by the filter regeneration control system according to an embodiment of the present invention—and in particular by the control unit 160—on a vehicle 100. As described in the following, according to an embodiment of the present invention two different types of filter regeneration process are envisaged, and particularly an automatic filter regeneration process, totally managed by the filter regeneration control system during the operation of the vehicle 100, and an emergency regeneration process—performed with the active involvement of the driver, or a technician of a service center—to be performed in case the automatic filter regeneration process has not given satisfactory results.

The control unit 160 firstly checks whether the vehicle 100 is running (block 405), for example according to a signal taken from the alternator (not shown in the figures) of the engine 105 of the vehicle 100. Alternatively, the control unit 160 may assess whether or not the engine 105 is turned on by detecting the presence or absence of the flow Flin of exhaust gas generated by the engine 105 when turned on; this can be achieved by monitoring the instantaneous pressure PRi.

Having assessed that the engine 105 is turned on (block 405, exit branch "Y"), the control unit 160 performs a first control ("pressure alarm control") on the values of the average pressure PRm and the instantaneous pressure PRi. Particularly, this control is performed for determining if the condition of PM load of the DPF 125 are so serious (from a PM occlusion point of view) to require a manual emergency regeneration process.

Particularly, the pressure alarm control (block 410) provides for a joint control on both the average pressure PRm and the instantaneous pressure PRi. If the value of the instantaneous pressure PRi remains within a range defined by a minimum alarm instantaneous pressure LAPRi (lower threshold) and a maximum alarm instantaneous pressure HAPRi (higher threshold) for a predetermined alarm time interval Δtall, and at the same time the value of the average pressure PRm belongs to a range defined by a minimum alarm average pressure LAPRm (lower threshold) and a maximum alarm average pressure HAPRm (higher threshold), then the control unit 160 assesses that the DPF 125 is excessively loaded by PM, and that the DPF 125 needs a (manual) emergency regeneration process. Both the maximum alarm instantaneous pressure HAPRi and the maximum alarm average pressure HAPRm may be set to the maximum pressure value that the pressure sensor PRS can sense (full-scale value). Since, as mentioned in the foregoing, the average pressure PRm is directly related to the load of PM accumulated in the DPF 125, the minimum alarm average pressure LAPRm is advantageously set to a value corresponding to a high load of PM accumulated in the DPF 125, but sufficiently low not to completely compromise the vehicle 100 operation (i.e., a value that ensures that the DPF 125 is not so loaded by PM that the engine 105 cannot efficiently run). Since also the instantaneous pressure PRi is related to the load of PM (the counter-pressure generated by the flow FLin of exhaust gas when passing through the DPF 125 depends on the PM accumulated in the DPF 125), also the minimum alarm instantaneous pressure LAPRi is advantageously set to a value corresponding to a relatively high load of PM accumulated in the DPF 125; in this way, a double check is made before deciding that the emergency regeneration has to be performed.

If the previous conditions are satisfied (exit branch "Y" of block 410), the filter regeneration control system signals an alarm condition; for example, the control unit 160 notifies the alarm condition to the vehicle driver through a corresponding signaling light on the dashboard (not shown in the figures). The vehicle driver should react to the signaled alarm condition by taking the steps necessary for performing the emergency regeneration process (block 415).

The emergency regeneration process may for example provide that the vehicle driver drives the vehicle 100 at a relatively high speed possible for about 10 minutes (compatibly with the traffic conditions and the speed limit restraints).

In this way, the temperature of the DPF 125 reaches a temperature favorable for the combustion of the PM included therein. At this point, the vehicle's march is arrested, and the engine 105 is set to the idling condition. Then, the driver manually controls the activation of the heating device 127, for example by means of a suitable switch (not shown in the figures) on the cockpit of the vehicle 100 connected to the control unit 160. The control unit 160 then drives the supply block 135 through the supply driver circuit 335, in such a way as to turn on the glow plugs GLP of the heating device 127. After a time that may depend on the glow plug type (for example, 20 seconds), the temperature of the heating elements HE contacting the input base BI of the DPF 125 reaches a substantially steady temperature of about 900° C. The PM accumulated in the DPF 125 in the proximity of the heating elements thus reaches the burning temperature for spontaneous combustion (for example, 350° C. in presence of fuel additive). Since the DPF 125 has been previously brought to a sufficiently high temperature by driving the vehicle 100 at high speed for about 10 minutes, the combustion of the PM propagates through the whole DPF filter 125.

After a predetermined amount of time, sufficient for allowing the average pressure PRm to adapt to the new condition of the DPF 125 after the activation of the glow plugs GLP (for example, 30 minutes), the control unit 160 checks whether the emergency regeneration has been successful or not (block 420). Particularly, the control unit 160 controls if the value of the average pressure PRm after the emergency regeneration still falls within the range defined by the minimum alarm average pressure LAPRm and the maximum alarm average pressure HAPRm or not.

In the affirmative case (exit branch "Y" of block 420), the control unit 160 decides that emergency regeneration was not successful, since the value of the average pressure PRm is still too high (this meaning that the PM included in the DPF 125 is still too high); the control unit 160 then increments a regeneration failure counter Nreg (block 425)—used to count the number of unsuccessful emergency regenerations—and checks if said counter has reached or not a maximum regeneration failure number MAXNreg (block 430). In the affirmative case (exit branch "Y" of block 430), the DPF 125 needs to be unmounted from the vehicle 100 for being substituted or fixed at a maintenance service center (block 435), since performing other emergency regenerations would be useless. On the contrary, if the regeneration failure counter Nreg is still lower then the maximum regeneration failure number MAXNreg (exit branch "N" of block 430), the operation flow returns to block 405 for performing again the pressure alarm control.

If instead the value of the average pressure PRm after the emergency regeneration has been assessed to be lower than the minimum alarm average pressure (exit branch "N" of block 420), the control unit 160 decides that the emergency regeneration has been successful; indeed, the fact that the value of the average pressure PRm is lower than the minimum alarm average pressure LAPRm means that the PM included in the DPF 125 has been burned out to a sufficient extent. In this latter case, the regeneration failure counter Nreg is reset to zero (block 440), and the emergency regeneration procedure is terminated (the operation flow returns to block 405).

During the normal operation of the vehicle 100, i.e., when the DPF 125 is not so occluded by PM to an extent such as to bring the filter regeneration control system in an alarm condition, the control unit 160 manages control operations for determining the when to activate the heating device 127 (i.e., the glow plugs GLP), in such a way that an efficient regeneration process is triggered.

Particularly, the control unit 160 monitors the current values of the average pressure PRm, the instantaneous pressure PRi and the instantaneous temperature Tfi, checking if said values are all within respective value ranges (block 445), and then activating or not the glow plugs GLP based on the result of said check.

Particularly, if:
the value of the instantaneous pressure PRi remains higher than a minimum instantaneous pressure LPRi (lower threshold) for a predetermined time interval $\Delta t(P)$,
the value of the average pressure PRm is higher than a minimum average pressure LPRm (lower threshold), and
the value of the instantaneous temperature Tfl remains within an interval defined by a minimum instantaneous temperature LT (lower threshold) and a maximum instantaneous temperature HT (higher threshold) for a predetermined time interval $\Delta t(T)$,
the control unit 160 determines that the glow plugs GLP can be activated for attempting a regeneration (exit branch "Y" of block 445), otherwise the glow plugs are not activated (exit branch "N" of block 445, returning to block 405).

When all the three conditions above are fulfilled, it is likely that the conditions of the DPF 125 are such as to ensure the triggering of a probable efficient regeneration process if the glow plugs GLP are activated at that moment. Particularly, in order to be in a good condition for an efficient regeneration process, which ensures at the same time not to unnecessarily activate the glow plugs GLP and wasting battery electric power, the temperature Tfl of the DPF 125 should be sufficiently high for allowing the propagation of the PM combustion through the whole DPF 125 (Tfl>LT), but it should as well be lower than a maximum value (HT), above which the activation of the glows plugs GLP would be unnecessary, since the PM would burn for spontaneous combustion. Moreover, the average pressure PRm should be higher than a minimum value (LPRm), since a too low average pressure PRm indicates that it is still not necessary to regenerate the DPF 125 and that the load of PM in the DPF 125 is not sufficient for guaranteeing a good PM combustion. The check on the instantaneous pressure PRi is made in order to derive an indication of whether, at the moment the glow plugs will be activated, the engine RPM is likely to high or low; moreover, the instantaneous pressure PRi gives a useful confirmation about the DPF 125 overload condition. The value of the instantaneous pressure PRi is related to the flow Flin of the exhaust gas at the input of the DPF 125. Since the higher the flow rate of the flow Flin, the higher the heat removal rate from the DPF 125, the glow plugs GLP should be activated when the flow FLin is as small as possible. Based on experimental trials, the Applicant has found that in the urban driving condition, i.e., in the condition in which the filter regeneration favored by the glow plugs activation is mostly necessary, after relatively high peaks of instantaneous pressure PRi, corresponding to relatively high flow Flin generated by a sudden increase of the engine RPM, the instantaneous pressure PRi (and correspondingly the flow Flin) falls (because the engine RPM decrease). Thus, every time a relatively high peak of instantaneous pressure PRi is detected, i.e., when the value of the instantaneous pressure PRi has exceeded the minimum instantaneous pressure LPRi, it is likely that the flow FLin of exhaust gas will subsequently decrease, a condition favorable for the activation of the glow plugs GLP.

In case the control unit 160 has assessed that the conditions are suitable for the activation of the heating device 127, it drives the supply driver circuit 335 to activate the glow plugs GLP for a predetermined amount of time (block 450), as previously described.

The control unit 160 then checks if the regeneration process has been successful or not. Particularly, after a predetermined amount of time, sufficient for allowing the average pressure PRm to adapt to the new condition of the DPF 125 after the activation of the glow plugs GLP (for example, 30 minutes), the control unit 160 controls if the value of the average pressure PRm after the regeneration is still higher than the minimum average pressure LPRm or not (block 455)

If the value of the average pressure PRm after the regeneration is lower than the minimum average pressure LPRm (exit branch "N" of block 455), the control unit 160 determines that the regeneration process has been successful, while in the opposite case, the regeneration process has not been successful (exit branch "Y" of block 455). In both cases, after the regeneration process the control unit 160 again checks if it is necessary a manual emergency regeneration process (returning to block 405 and then to block 410). However, in case the control unit 160 has determined that the regeneration process has been successful, the regeneration failure counter Nreg is reset to zero (block 460). According to an embodiment of the present invention, the control unit 160 may perform further operations directed to optimize the values of the minimum average pressure LPRm for improving the efficiency of the filter regeneration process based on information collected by the control unit 160 after the glow plugs have been activated. A description of said operations will be provided in the following of the description (particularly, in connection to FIG. 6).

All the operations that have been described with reference to FIG. 4 may be performed by the control unit 160 by executing a sequence of instructions of a firmware stored in the control unit 160 itself—for example, in the ROM 320—and executed by the processing unit 310.

In order to improve the efficiency, according to an embodiment of the present invention, the filter regeneration system performs the above described controls on the current values of the average pressure PRm, the instantaneous pressure PRi and the instantaneous temperature Tfl using threshold values that are optimized for the specific vehicle 100 and for its driving conditions.

According to an embodiment of the present invention, the threshold values used by the control unit 160 for assessing when to activate the glow plugs GLP are adjustable. Preferably, the threshold values used by the control unit 160 for assessing when to activate the glow plugs GLP are automatically determined by the control unit 160 itself during the vehicle 100 operation, fitting them to the particular driving conditions of the moment.

Regarding in particular the instantaneous temperature Tfl, the minimum instantaneous temperature LT and the maximum instantaneous temperature HT may be determined starting from preliminary experimental results, obtained through test campaigns performed on the field, for example on a test vehicle corresponding to the vehicle 100 on which the system is intended to be installed.

Figure 5A:
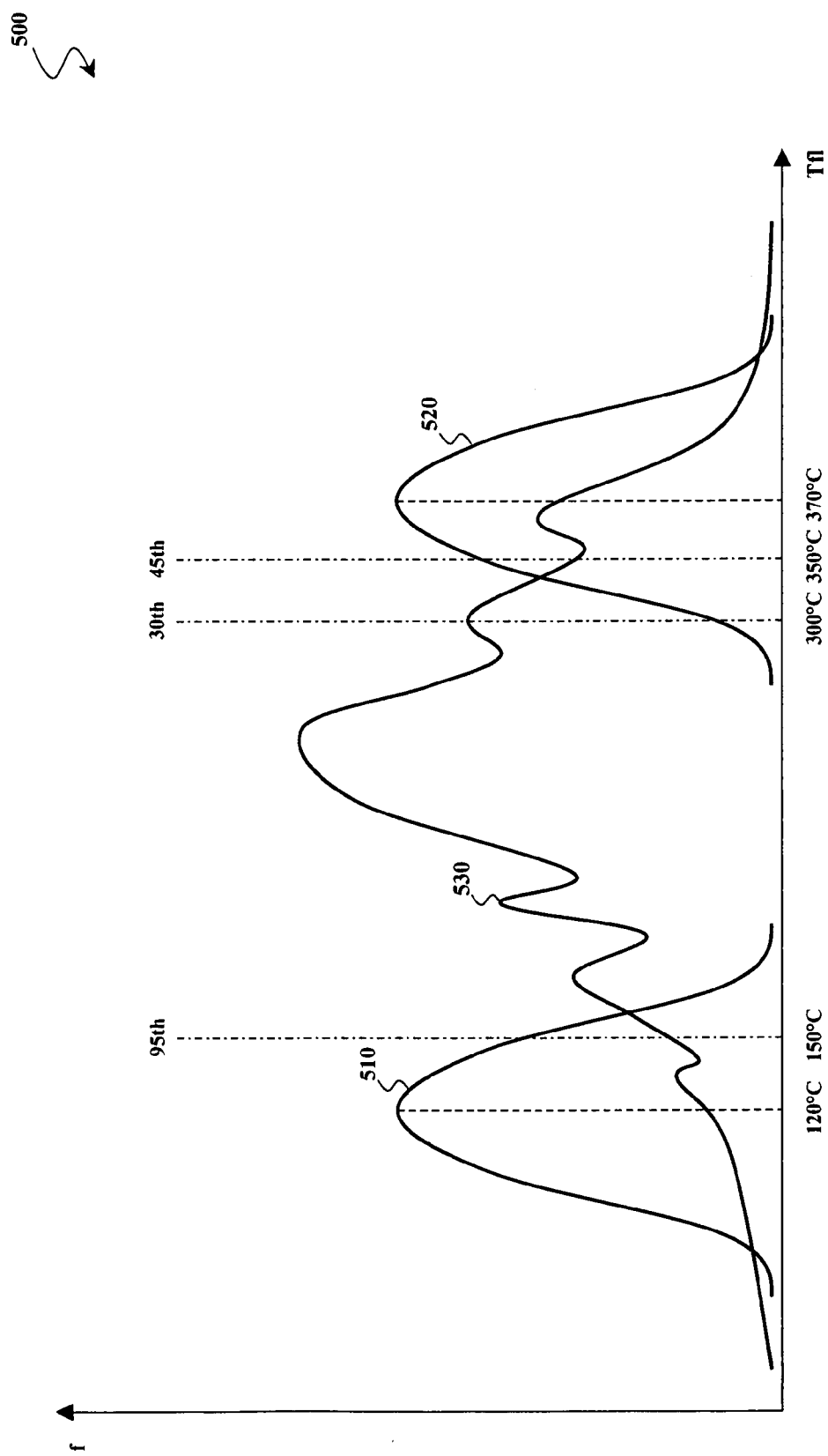
FIG. 5A illustrates experimental results obtained through an exemplary temperature test campaign.

FIG. 5A illustrates the experimental results obtained through an exemplary test campaign. Samples of the instantaneous temperature Tfl of the DPF 125 are collected by monitoring the test vehicle in two distinct operating conditions, namely a "urban" condition, which is unfavorable for the natural PM combustion, in which the test vehicle is driven essentially in a urban scenario, at relatively low speeds and with frequent stops, and a "highway" condition, favorable for the PM combustion, wherein the test vehicle is driven essentially continuously at relatively high speeds, with few stops.

FIG. 5A shows a diagram 500 in which the abscissa indicates the instantaneous temperature Tfl of the DPF, and the ordinate indicates the frequency of samples taken during the test campaign. The samples statistical distribution corresponding to the urban condition—denoted in FIG. 5A with reference 510—is centered around a low temperature value (for example, 120° C.), while the samples statistical distribution corresponding to the highway condition—indicated in FIG. 5A with the reference 520—is centered around a higher temperature value (for example, 370° C.). This is a reasonable outcome, since in the urban condition the vehicle 100 is subjected to low stresses, and the engine 105 essentially works at low RPM, while in the highway condition the engine works at higher RPM.

In order to derive useful values for the temperature thresholds, i.e. the minimum instantaneous temperature LT and the maximum instantaneous temperature HT, the statistical distributions 510 and 520 are compared with two temperature threshold, namely a low temperature threshold ALT corresponding to the minimum temperature of the DPF 125 that allows the PM combustion to propagate through the DPF 125 once triggered by the glow plugs GLP (e.g., 150° C.), and a high temperature threshold AHT corresponding to the temperature above which the PM burns for self combustion and the activation of the glow plugs GLP is no longer necessary for triggering the PM combustion (e.g., 350° C.).

Comparing such two low and high temperature thresholds ALT and AHT with the distributions 510 and 520, it is possible to infer that the low temperature threshold ALT corresponds to a relatively high percentile of the distribution 510 (for example, higher than the 70th percentile and preferably equal to approximately the 95th percentile), while the high temperature threshold AHT corresponds to a relatively low percentile of the distribution 520 (for example, lower than the 45th percentile and preferably equal to approximately the 30th percentile).

In a practical case (like during the operation of the control unit 160), said statistical distribution of the temperature value samples will generally differ from both the distribution 510 and the distribution 520, for example because before reaching a highway, the vehicle 100 first travel in a scenario similar to that corresponding to the urban condition, represented by the distribution 520. An example of a more close-to-reality statistical distribution is indicated in FIG. 5A with the reference 530. It can be observed that the distribution 530 is less regular, being more spread across a wider range of temperature values extending from those corresponding to the distribution 510 to those corresponding to the distribution 520.

Based on statistical computations, it is possible to deduce the percentiles of the distribution 530 that correspond to the minimum instantaneous temperature LT and the maximum instantaneous temperature HT using the percentiles corresponding to the temperature thresholds ALT, AHT of the distributions 510 and 520, respectively, with a good approximation. For example, starting from a low temperature threshold ALT corresponding to the 95th percentile of the distribution 510 and from a high temperature threshold HLT corresponding to the 45th percentile of the distribution 520, a good approximation may give as a result a minimum instantaneous temperature LT corresponding to the 30th percentile and a maximum instantaneous temperature HT corresponding to the 70th percentile of the distribution 530.

However, the Applicant has observed that even if the temperatures of the distribution 520 lower than but relatively close to that for which the PM burns for self combustion (i.e., 350° C.) are favorable to the PM combustion, and thus would in principle be favorable for the activation of the glow plugs GLP, said range of temperature corresponds to a condition that in which no great advantage can be taken by the activation of the glow plugs GLP. Particularly, the temperatures of the distribution 520 that are lower than but relatively close to the temperature for which the PM burns for self combustion may correspond to a condition in which the engine 105 works at high RPM, which in turn corresponds to a condition in which the flow rate of the flow Flin is relatively high. As already mentioned in the present description, a high flow rate Flin negatively affects the triggering of the combustion of the PM and that of the regeneration process, since the higher the flow rate of the flow Flin, the more heat is removed from the DPF 125.

As a consequence, according to an embodiment of the present invention, the maximum instantaneous temperature HT may be calculated using a lower percentile of the distribution 520, for example the 30th percentile or a lower percentile. Thus, even if in this way a range of temperatures which are in principle favorable for the PM combustion (under the temperature point of view) are "discarded", and the activation of the glow plugs GLP is performed at lower temperatures, it is assured that the glow plugs GLP are activated in a more convenient condition, with a flow rate Flin that is not too high.

According to an embodiment of the present invention, the results obtained from the test campaign are then used by the control unit 160 for dynamically adjusting the minimum instantaneous temperature LT and the maximum instantaneous temperature HT based on the driving condition of the vehicle 100.

Figure 5B:
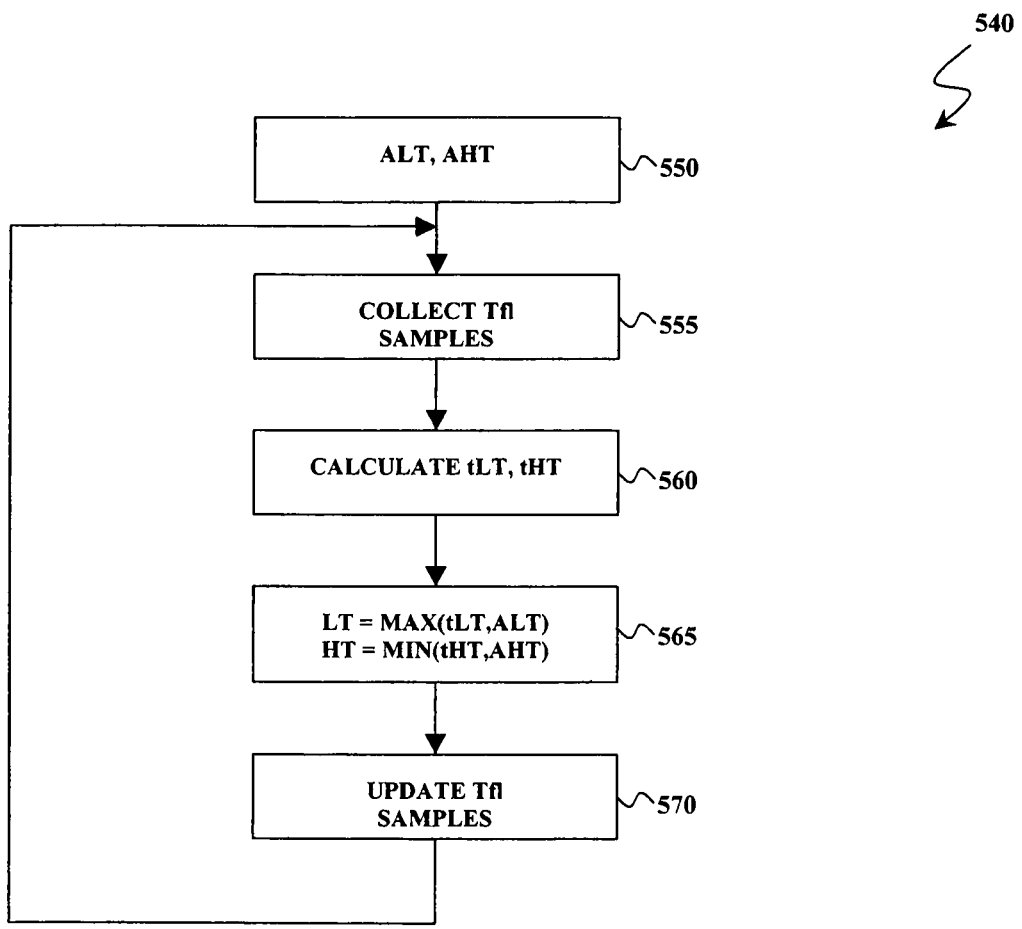
FIG. 5B depicts a flow chart illustrating the operations performed by the control unit of FIG. 1 for determining temperature threshold values to be used for the operations performed by the filter regeneration control system in the flow chart of FIG. 4.
Figure 5C:
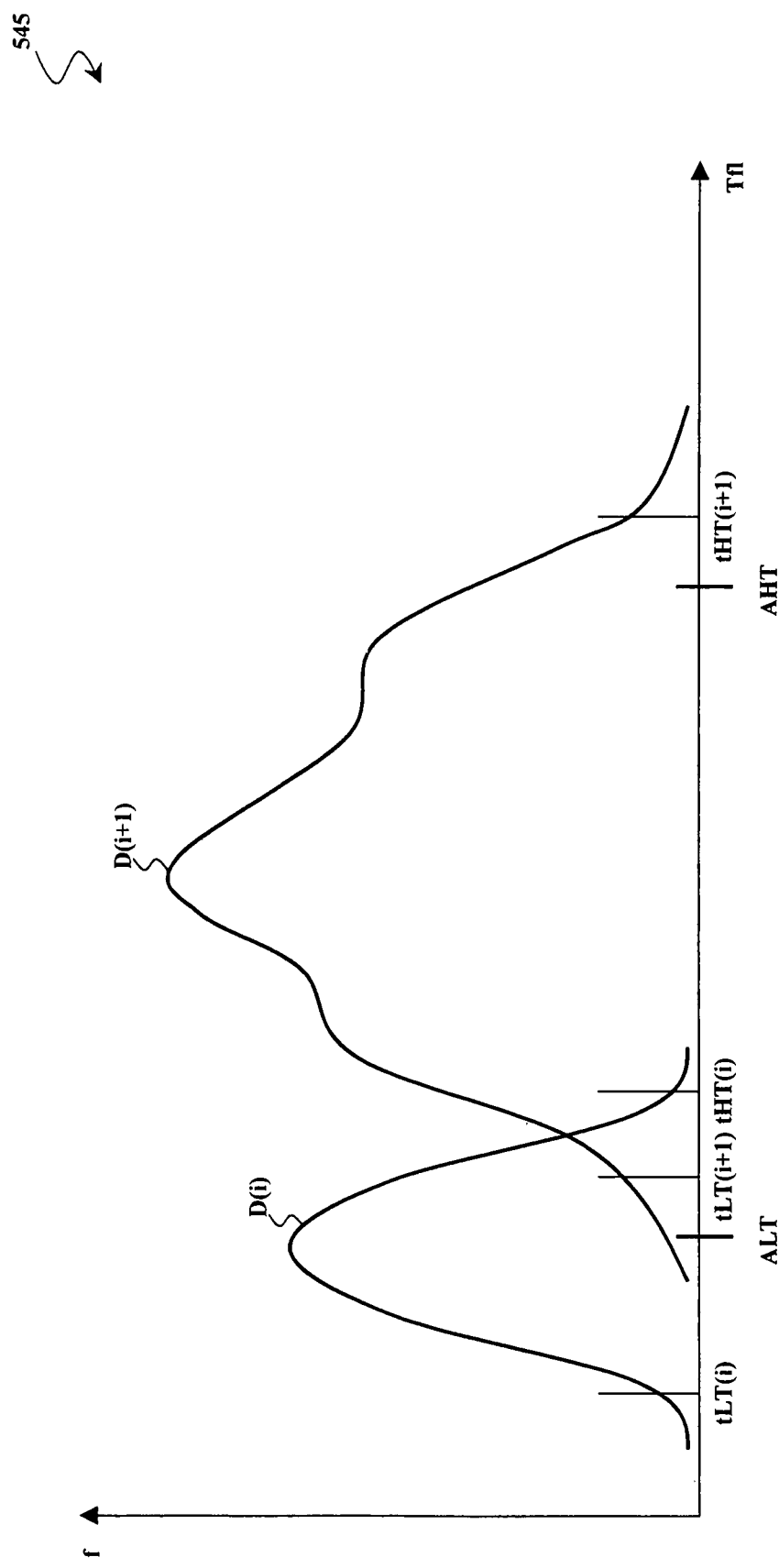
FIG. 5C depicts exemplary statistical distributions of instantaneous temperatures used for performing the operations of the flow chart of FIG. 5B.

Reference is now made to the flow chart 540 depicted in FIG. 5B, illustrating the operations performed by the control unit 160, together with a diagram 545 shown in FIG. 5C, in which the abscissa indicates exemplary values of the instantaneous temperature Tfl of the DPF 125 that may be sampled during the operation of the vehicle 100, and the ordinate indicates the frequency of samples for each instantaneous temperature value.

The control unit 160 stores as configuration parameters, for example in the ROM 320, the low and high temperature thresholds ALT, HLT, to be used as default temperature threshold values in case the temperature threshold values calculated using the samples taken during the actual vehicle run results unsuitable, as will be described in the following (block 550).

When the engine 105 of the vehicle 100 is started, the control unit 160 starts collecting samples of the instantaneous temperature Tfl (block 555). As the control unit 160 collects instantaneous temperature Tfl samples, a temperature sample log—including a number TNS of samples (for example, 200)—is progressively filled to generate a first distribution of instantaneous temperatures Tfl—indicated in FIG. 5C with the reference D(i). As can be observed in FIG. 5C, the distribution D(i) is similar to the distribution 510 corresponding to the urban condition obtained with the preliminary test campaign (FIG. 5A). A reason for this is that, at the beginning of any travel, the vehicle 100 is in a condition similar to that represented by the distribution 510 (at the beginning of the travel, the vehicle 100 starts with the engine 105 that is cold, and probably travels in a urban scenario, or at least in a scenario that does not allow reaching high speeds for long periods).

Then, the control unit 160 calculates a tentative minimum instantaneous temperature tLT and a tentative maximum instantaneous temperature tHT, using the percentiles calculated according to the experimental results and stored in the memory 320 as part of the configuration parameters, and applying said percentiles to the distribution D(i). Making reference to the example at issue, the tentative minimum instantaneous temperature tLT is calculated taking the 30th percentile of the distribution D(i), while the tentative maximum instantaneous temperature tHT is calculated taking the 70th percentile of the distribution D(i) (block 560). Said tentative values are indicated in the diagram 545 of FIG. 5C with the references tLT(i) and tHT(i).

At this point, the control unit 160 sets the minimum instantaneous temperature LT to the maximum value between the tentative minimum instantaneous temperature tLT and the low temperature threshold ALT, while the maximum instantaneous temperature HT is set equal to the minimum value between the tentative maximum instantaneous temperature tHT and the high temperature threshold AHT (block 565). In this way, it is ensured that a tentative minimum instantaneous temperature tLT lower than the low temperature threshold ALT is discarded, since it corresponds to a temperature Tfl lower than the minimum one sufficient for allowing the PM combustion to propagate through the DPF 125 once triggered by the glow plugs GLP (e.g., 150° C.); similarly, it is ensured that a tentative maximum instantaneous temperature tHT higher than the high temperature threshold AHT is discarded, since it corresponds to a temperature Tfl higher than the maximum one for which the activation of the glow plugs GLP is required for activating the PM combustion (e.g., 350° C.) and beyond which the PM burns for self combustion).

Thus, the tentative minimum instantaneous temperature tLT(i) obtained with the exemplary distribution D(i) will be discarded—being lower than the low temperature threshold ALT—, while the tentative maximum instantaneous temperature tHT(i) will be maintained—being lower than the high temperature threshold AHT.

Preferably, if both the tentative minimum instantaneous temperature tLT(i) and the tentative maximum instantaneous temperature tHT(i) are lower than the low temperature threshold ALT, the control unit 160 may set the minimum instantaneous temperature LT to the low temperature threshold ALT and the maximum instantaneous temperature HT to the high temperature threshold AHT. Alternatively, in case both the tentative minimum instantaneous temperature tLT(i) and the tentative maximum instantaneous temperature tHT(i) are lower than the low temperature threshold ALT, the control unit 160 may maintain the minimum instantaneous temperature LT and the maximum instantaneous temperature HT that were calculated in a previous step.

Then, as the vehicle travel proceeds, the temperature sample log is updated with new Tfl samples (block 570), and the process is reiterated (returning to block 560). Particularly, the control unit 160 updates the sample log with a number (possibly equal to one) of new Tfl samples, removing therefrom a corresponding number of the oldest Tfl samples, and recalculates the tentative minimum instantaneous temperature tLT and the tentative maximum instantaneous temperature tHT using the same percentiles used before but applying them to the new distribution—indicated in FIG. 5C with the reference D(i+1).

In the example of FIG. 5C, the new distribution D(i+1) is wider, for example because the engine 105 is now working at a higher temperature, and the vehicle 100 is traveling at higher speeds. Making still reference to the exemplary distribution D(i+1) of FIG. 5C, the new tentative minimum instantaneous temperature—indicated in FIG. 5C with the reference tLT(i+1) has overtaken the low temperature threshold ALT, while the new tentative maximum instantaneous temperature—tHT(i+1) in FIG. 5C is now higher than the high temperature threshold HLT. Thus, the minimum instantaneous temperature LT will be set equal to the value tlT(i+1), while the maximum instantaneous temperature HT will be now equal to the high temperature threshold AHT.

Preferably, if both the tentative minimum instantaneous temperature tLT(i+1) and the tentative maximum instantaneous temperature tHT(i+1) are higher than the high temperature threshold AHT, the control unit 160 may set the minimum instantaneous temperature LT to the low temperature threshold ALT and the maximum instantaneous temperature HT to the high temperature threshold AHT. Alternatively, in case both the tentative minimum instantaneous temperature tLT(i+1) and the tentative maximum instantaneous temperature tHT(i+1) are higher than the high temperature threshold AHT, the control unit 160 may maintain the minimum instantaneous temperature LT and the maximum instantaneous temperature HT that were calculated in a previous step.

All the operations that have been described with reference to FIGS. 5B and 5C are performed by the control unit 160 together with the operations described with reference to FIG. 4.

Thus, according to an embodiment of the present invention, instead of having fixed temperature threshold values for assessing if the instantaneous temperature Tfl of the DFP 125 is at a favorable level for activating the glow plugs GLP, said thresholds are advantageously determined by the control unit 160 dynamically, so as to fit the actual driving condition of the vehicle 100.

According to another embodiment of the present invention, the minimum and maximum instantaneous temperature thresholds LT, HT may be set by the control unit 160 using predetermined relationships—e.g., determined during the test campaign and stored in the memory 320 as part of the configuration parameters—which establish the values of the minimum and maximum instantaneous temperature thresholds LT, HT on the basis of where the statistical distribution of the samples of instantaneous temperature is located with respect to the low temperature threshold ALT and the high temperature threshold AHT. The position of the statistical distribution of the samples of instantaneous temperature may be determined by observing which temperature value corresponds to a first percentile of the statistical distribution, relatively higher than the 50th percentile thereof, e.g., the 70th. According to this embodiment, the values of the minimum and maximum instantaneous temperature thresholds LT, HT are set by the control unit 160 according to a relationship that provides the values for the minimum and maximum instantaneous temperature thresholds LT, HT using said first percentile. For example, this relationship may be implemented through a relationship table stored in the memory 320, which includes, for each value (or for each range of values) that said first percentile may assume in a predetermined range including the low temperature threshold ALT and the high temperature threshold AHT, a corresponding pair of predetermined values for the minimum and maximum instantaneous temperature thresholds LT, HT. Additionally, instead of having fixed, predetermined minimum and maximum instantaneous temperature thresholds LT, HT values, the table may provide—for some values that said first percentile may assume—further percentiles to be calculated again on the statistical distribution of the samples of instantaneous temperature for obtaining the minimum and/or the maximum instantaneous temperature thresholds LT, HT. A possible example of said relationship table, wherein the first percentile is the 70th of the statistical distribution, the low temperature threshold ALT is equal to 150° C. and the high temperature threshold AHT is equal to 350° C., is illustrated in the following:

| 1st percentile (70th) | LT | HT |
|---|---|---|
| 140° C. | 150° C. | 99th |
| 160° C. | 70th | 95th |
| 240° C. | 40th | 80th |
| 260° C. | 30th | 70th |
| 340° C. | 20th | 60th |
| 360° C. | 10th | 350° C. |

According to this example, if the 70th percentile of the statistical distribution of the samples of instantaneous temperature is equal (or close) to 140° C. (that is lower than the low temperature threshold ALT, which is 150° C.), the control unit 160 directly sets the minimum instantaneous temperature threshold LT to the low temperature threshold ALT (150° C.), while sets the maximum instantaneous temperature threshold HT to the 99th percentile of the statistical distribution of the samples of instantaneous temperature; if instead the 70th percentile is equal (or close) to 160° C., the control unit 160 sets the minimum instantaneous temperature threshold LT to the 70th percentile of the statistical distribution, while sets the maximum instantaneous temperature threshold HT to the 95th percentile of the statistical distribution, and so on.

According to a still further embodiment of the present invention, the control unit 160 may be capable of inferring, from the statistical distribution of the samples of instantaneous temperature, the vehicle driving condition, and accordingly set the minimum and maximum instantaneous temperature thresholds LT, HT. Exploiting the percentiles calculated as described above, according to the experimental results, and stored in the memory 320 as part of the configuration parameters, the control unit 160 may establish whether the actual statistical distribution of the samples of instantaneous temperature it has collected substantially corresponds to the distribution 510 or to the distribution 520. For example, in order to establish whether the actual statistical distribution substantially corresponds to the urban distribution 510, the control unit 160 may calculate the tentative minimum instantaneous temperature tLT, using the 30th percentile stored as configuration parameter: if the calculate tentative minimum instantaneous temperature tLT is significantly lower than the low temperature threshold ALT (e.g., 150° C.), then the control unit 160 may decide that the vehicle is being driven in a urban environment, for which the statistical distribution 510 applies; the control unit 160 may in this case take a high percentile, e.g. higher than the 70th, and preferably the 95th of the actual statistical distribution, and calculate the tentative minimum instantaneous temperature tLT. If the calculated tentative minimum instantaneous temperature tLT is lower than the low temperature threshold ALT, the control unit 160 sets the minimum instantaneous temperature tLT equal to the low temperature threshold ALT. If the calculated tentative minimum instantaneous temperature tLT falls within a temperature range defined by the low temperature threshold ALT and a minimum instantaneous temperature upper limit (e.g., 200° C.), the minimum instantaneous temperature tLT is set equal to the calculated tentative minimum instantaneous temperature tLT. If instead the calculated tentative minimum instantaneous temperature tLT is higher than the minimum instantaneous temperature upper limit (this may occur in case the actual statistical distribution is centered around a low temperature, such as 120°-150° C., but has an extended upper tail that corresponds to relatively high temperature values), the minimum instantaneous temperature tLT is set equal to said minimum instantaneous temperature upper limit.

Similarly, the control unit 160 may calculate the tentative maximum instantaneous temperature tHT, using the 70th percentile stored as configuration parameter: if the calculate tentative minimum instantaneous temperature tHT is significantly higher than the high temperature threshold AHT (e.g., 350° C.), then the control unit 160 may decide that the vehicle is being driven in a motorway environment, for which the statistical distribution 520 applies. The control unit 160 may in this case take a low percentile, e.g. lower than the 45th, and preferably the 30th of the actual statistical distribution, and calculate the tentative maximum instantaneous temperature tHT. If the calculated tentative maximum instantaneous temperature tHT is higher than the high temperature threshold AHT, the control unit 160 sets the maximum instantaneous temperature tHT equal to the high temperature threshold AHT. If the calculated tentative maximum instantaneous temperature tHT falls within a temperature range defined by the high temperature threshold AHT and a maximum instantaneous temperature lower limit (e.g., 250° C.), the maximum instantaneous temperature tHT is set equal to the calculated tentative maximum instantaneous temperature tHT. If instead the calculated tentative maximum instantaneous temperature tHT is lower than the maximum instantaneous temperature lower limit (this may occur in case the actual statistical distribution is centered around a high temperature, such as 300°-350° C., but has an extended lower tail that corresponds to relatively low temperature values), the maximum instantaneous temperature tHT is set equal to said maximum instantaneous temperature lower limit.

According to an embodiment of the present invention, also the value of the minimum average pressure LPRm may be dynamically determined by the control unit 160 in an automatic way to improve the filter regeneration process based on the vehicle 100 operating condition (and in particular based on the DPF 125 condition).

Figure 6:
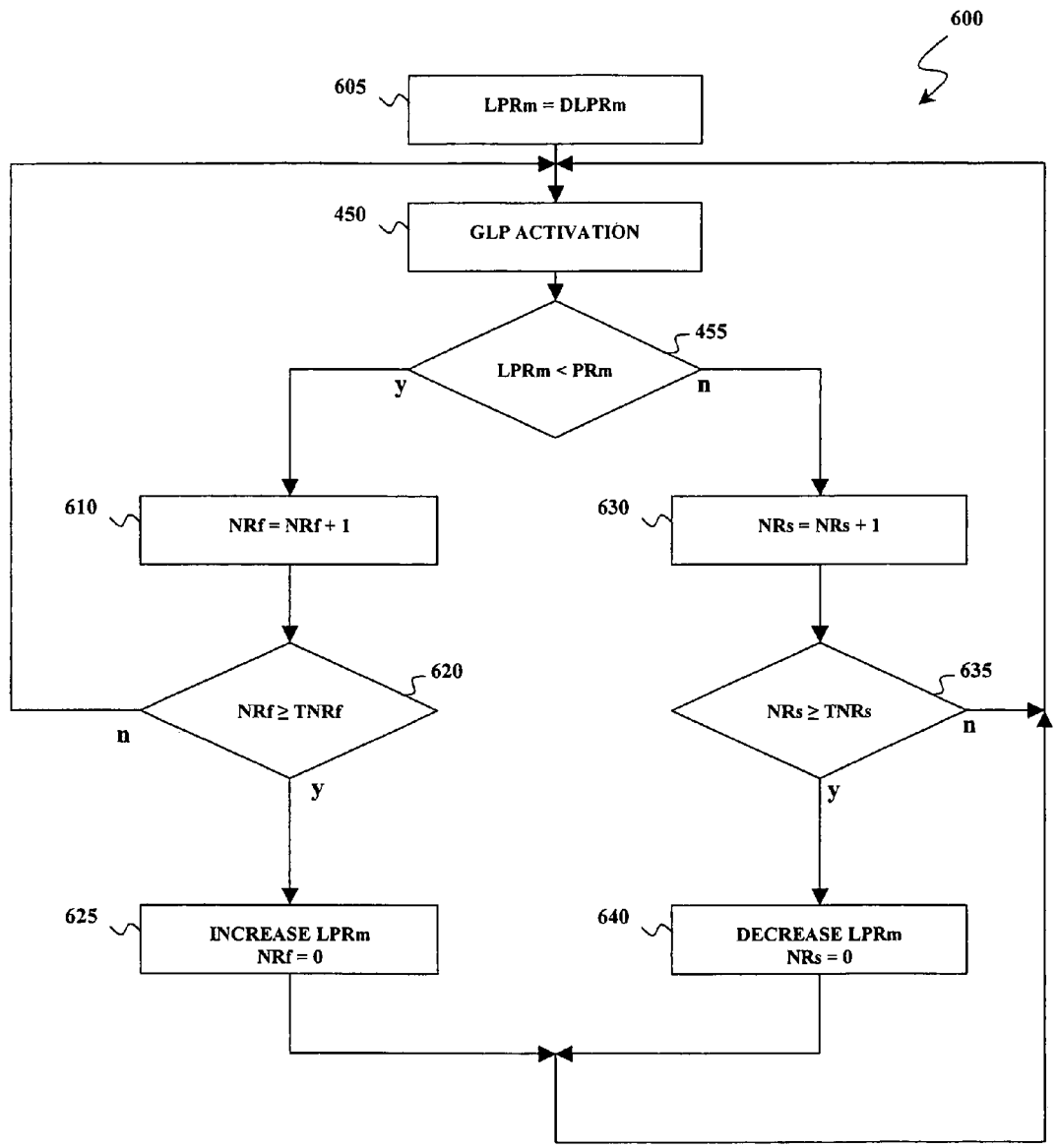
FIG. 6 depicts a flow chart illustrating the operations performed by the control unit of FIG. 1 for determining average pressure threshold values to be used for the operations performed by the filter regeneration control system in the flow chart of FIG. 4.

Making reference to the flow chart 600 illustrated in FIG. 6, the operations which are shown in the flow chart 600 are performed during the vehicle 100 operation, and integrate the operations of the control unit 160 shown in the flow chart 400 of FIG. 4. For this reason, the blocks corresponding to those shown in the FIG. 4 are denoted with the same references, and their explanation is omitted for the sake of brevity The control unit 160 stores, for example in the ROM 320, default values for the minimum average pressure (block 605). Particularly, the minimum average pressure LPRm may be instead initially set to a default minimum average pressure DLPRm corresponding to a relatively high value, in such a way to avoid that, at the beginning of the vehicle 100 operation, the glow plugs GLP are unnecessarily activated even when the PM accumulated in the DPF 125 is low (indeed, the value of the average pressure PRm is directly related to the PM blockage of the DPF 125).

At this point, the control unit 160 performs the normal operations previously described in connection with FIG. 4 for determining whether to activate the glow plugs GLP (blocks 445, 450), and then checks if the regeneration process has been successful or not, by controlling if the value of the average pressure PRm after the regeneration is still higher than the minimum average pressure LPRm or not after a predetermined amount of time (block 455).

In case the value of the average pressure PRm is still higher than the minimum average pressure LPRm (exit branch "Y" of block 455), meaning that the regeneration process has not been successful, the control unit 160 increments a regeneration fault counter NRf, for example stored in the working memory 315 (block 610). At this point, the control unit 160 checks if the value of said regeneration fault counter NRf has reached or not a preset regeneration fault threshold TNRf (block 620). If the regeneration fault counter NRf results to be lower than the regeneration fault threshold TNRf (exit branch "N" of block 620), no further additional operation is performed on the minimum average pressure LPRm, and the operation flow of the control unit 160 returns to block 445. IL instead the regeneration fault counter NRf reaches the value of the regeneration fault threshold TNRf (exit branch "Y" of block 620), it means that a number TNRf of consecutive activations of the glow plugs GLP has not been successful. In this case, the minimum average pressure LPRm is increased (for example by a predetermined amount, and until a predetermined maximum value, e.g., corresponding to the default minimum average pressure DLPRm), in such a way that the following activation of the glow plugs GLP will be conditioned to a higher average pressure PRm (block 625). This means that the regeneration process will be facilitated with respect to the previous cases, since the activation of the glow plugs will occur with a higher load of PM to be combusted. After having increased the minimum average pressure LPRm, the regeneration fault counter NRf is reset to zero, and the operation flow of the control unit 160 returns to block 445.

In case instead after the activation of the glow plugs GLP the value of the average pressure PRm has fallen below the minimum average pressure LPRm (exit branch "N" of block 455), meaning that the regeneration process has been successful, the control unit 160 increments a regeneration successful counter NRs, for example stored in the working memory 315 (block 630). The control unit 160 then checks if the value of said regeneration successful counter NRs has reached or not a preset regeneration successful threshold TNRs (block 635). If the regeneration successful counter NRs is lower than the regeneration successful threshold TNRs (exit branch "N" of block 635), no further additional operation is performed on the minimum average pressure LPRm, and the operation flow of the control unit 160 returns to block 445. If instead the regeneration successful counter NRs has reached the value of the regeneration successful threshold TNRs (exit branch "Y" of block 635), it means that a number TNRs of consecutive activations of the glow plugs GLP has been successful. In this case, the minimum average pressure LPRm is decreased (for example by a predetermined amount, and down to a predetermined minimum value), in such a way that the subsequent activation of the glow plugs GLP will be conditioned to a lower average pressure PRm (block 640). This means that the subsequent activation of the glow plugs will occur with a lower load of PM to be combusted, since it is likely that the previous activations of the glow plugs GLP have been performed with an excessive PM load. After having decreased the minimum average pressure LPRm, the regeneration successful counter NRs is reset to zero, and the operation flow of the control unit 160 returns to block 445.

According to a further embodiment of the present invention, the procedure for dynamically determining the minimum average pressure LPRm can be further improved, by conditioning the extent of the increments/decrements of the minimum average pressure LPRm to the variation of the average pressure PRm after the activation of the glow plugs GLP. Particularly, based on the extent of the variation of the average pressure PRm after the activation of the glow plugs GLP, it is possible to quantify extent to which the regeneration process has been successful/unsuccessful. For example, if the activation of the glow plugs GLP gives as a result only a little decrease of the average pressure PRm, it means that said activation has triggered the combustion of only a little fraction of the PM included in the DPF 125. If instead the activation of the glow plugs GLP has given as a result a greater decrease of the average pressure PRm, it means that said activation has triggered the combustion of a greater fraction of the PM included in the DPF 125. Based on these considerations, instead of increasing/decreasing the minimum average pressure LPRm by fixed amounts, as previously described with reference to FIG. 6, the increments/decrements may be a function of the variation of the average pressure PRm. For example, the control unit 160 may calculate the variation of the average pressure PRm by subtracting the value of the average pressure PRm after an activation of the glow plugs GLP from the value of the average pressure PRm before the activation of the glow plugs GLP, and then using said value for weighing preset increment and decrement amounts.

According to an embodiment of the present invention, a further way for improving the efficiency of the filter regeneration process is to dynamically adjust the value of the minimum instantaneous pressure LPRi based on the vehicle 100 condition (particularly, based on the driving condition).

As described in the foregoing, the test performed on the instantaneous pressure value to assess whether it exceeds the minimum instantaneous pressure LPRi is used to condition the activation of the glow plugs to the occurrence of a relatively high peak in the instantaneous pressure, because it has been found that, statistically, in a urban driving condition, after such a peak a decrease in the exhaust gas flow takes place (which is a favorable condition for the combustion of the PM in the DPF 125).

Figure 7:
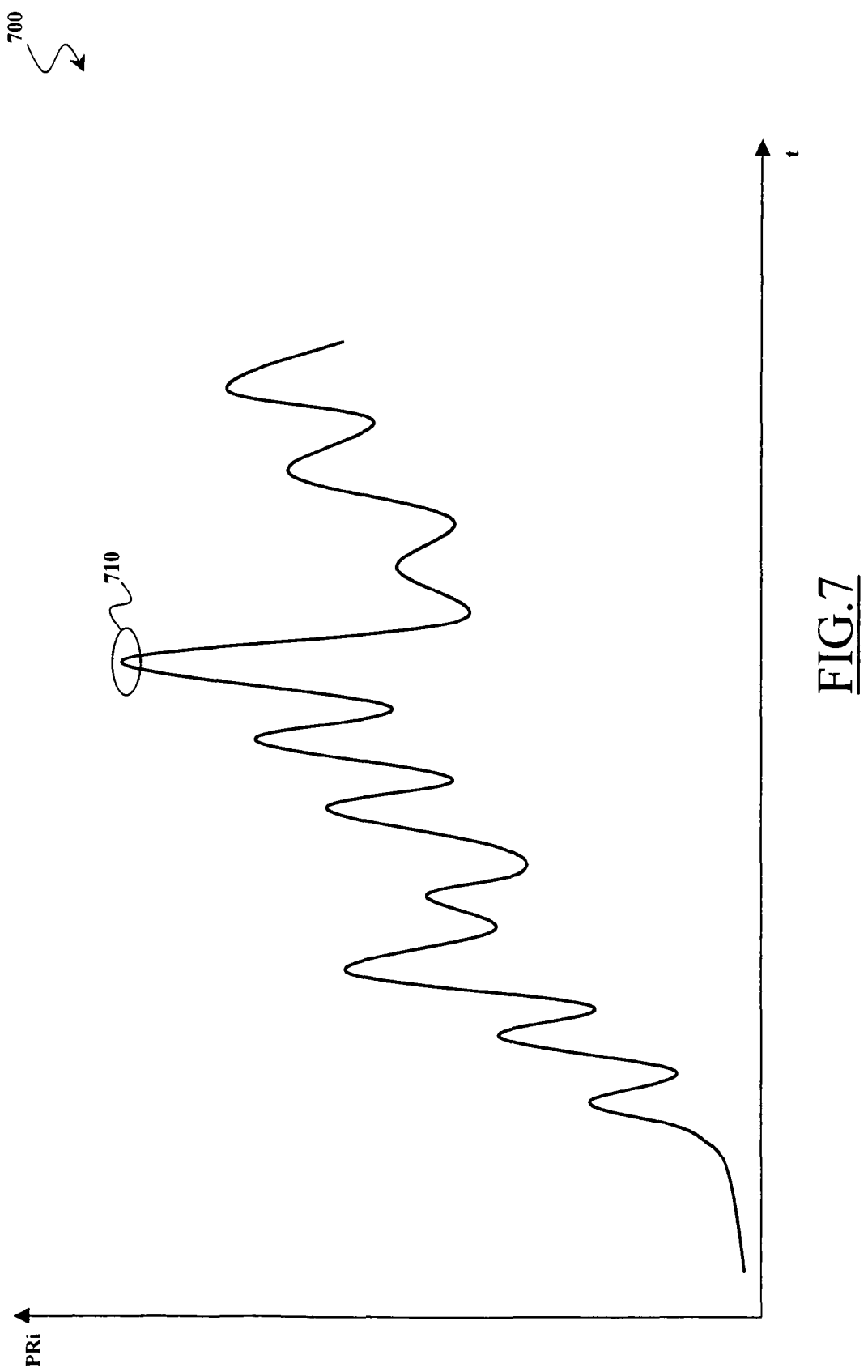
FIG. 7 depicts a diagram showing an exemplary evolution in time of the instantaneous pressure during the vehicle operation.

FIG. 7 depicts a diagram 700 showing an exemplary evolution in time of the instantaneous pressure PRi during the vehicle 100 operation. Particularly, the abscissa of the diagram 700 indicates the time, while the ordinate indicates the value of the instantaneous pressure PRi. The instantaneous pressure PRi has an oscillating trend, following the RPM of the engine 105, with an average value that increases in time (due to the increase of the PM load in the DPF 125, that causes a constant increase of the average pressure PRm). After a relatively high peak in the instantaneous pressure PRi—like the one indicated in FIG. 7 with the reference 710—, the flow FLin of exhaust gas decreases significantly.

Figure 8A:
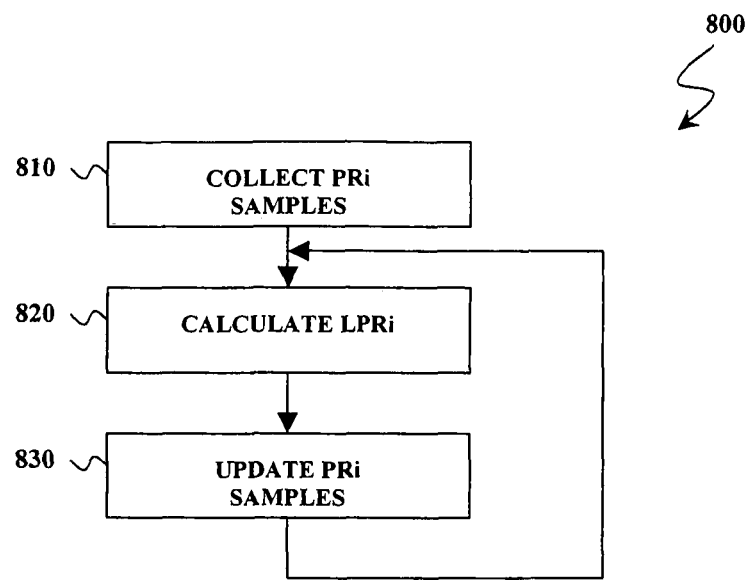
FIG. 8A depicts a flow chart illustrating the operations performed by the control unit of FIG. 1 for determining instantaneous pressure threshold values to be used for the operations performed by the filter regeneration control system in the flow chart of FIG. 4.

During the operation of the vehicle 100, the control unit 160 dynamically sets the minimum instantaneous pressure LPRi as described in the schematic flowchart 800 of FIG. 8A.

Figure 8B:
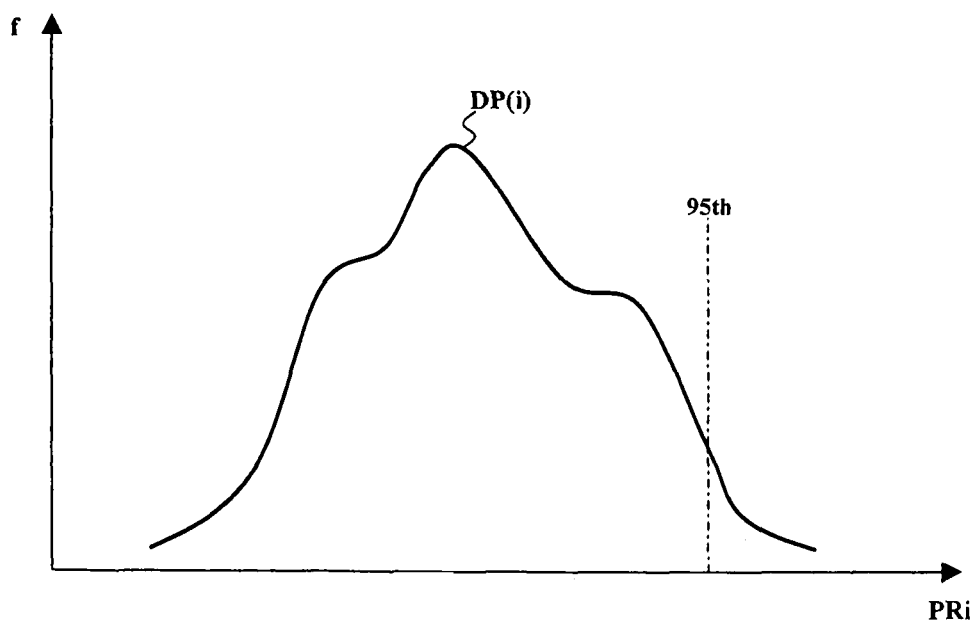
FIG. 8B depicts an exemplary statistical distribution of a instantaneous pressure log.

As soon as the engine 105 of the vehicle 100 is started, the control unit 160 begins to collect samples of the instantaneous pressure PRi (block 810). As the control unit 160 collects PRi samples, a pressure sample log—including a number PNS of samples (for example, 200)—is progressively filled to generate a statistical distribution of instantaneous pressures PRi. An example of such a distribution is shown in FIG. 8B with the reference DP(i), wherein the abscissa indicates the possible values of the instantaneous pressure PRi that can be sampled during the operation of the vehicle 100, and the ordinate indicates the frequency of samples for each pressure value.

The control unit 160 sets the value of the minimum instantaneous pressure LPRi using the information obtainable from the distribution DP(i) corresponding to the actual pressure sample log (block 820). More particularly, the control unit sets the minimum instantaneous pressure LPRi to a pressure value corresponding to a relatively high percentile (e.g., the 95% percentile) of the distribution DP(i), in such a way to select a pressure corresponding to a high peak. Alternatively, the control unit 160 may firstly select from the PNS samples of the pressure sample log, those samples that correspond to instantaneous pressures PRi higher than the average pressure PRm for generating a corresponding further statistical distribution of instantaneous pressures PRi, and then set the value of the minimum instantaneous pressure LPRi to a pressure value corresponding to said relatively high percentile of the further statistical distribution.

Then, the pressure sample log is updated with new, incoming PRi samples (block 830), and the process is reiterated (returning to block 810). Particularly, the control unit 160 updates the sample log with a number (possibly one) of new PRi samples, removing therefrom a corresponding number of the oldest PRi samples, and recalculates the minimum instantaneous pressure LPRi on the basis of the distribution obtained with the new sample log.

In order to further improve the efficiency of the proposed filter regeneration system, the possibility may also be contemplated that, in operation, the control unit 160 varies the value of the percentile of the distribution DP(i) used for setting the minimum instantaneous pressure LPRi, so as to better fit the expected driving condition of the vehicle 100.

In conclusion, the filter regeneration system according to the embodiments of the invention herein described allows to substantially improve the efficiency of the regeneration process of a DPF for a vehicle, both in terms of power consumption and reliability. Particularly, with the proposed solution, the heating device is activated only when the conditions for a successful filter regeneration are favorable. In this way, the occurrence of unnecessary activations of the heating device are reduced, so as to avoid excessive waste of electrical power.

Moreover, the proposed filter regeneration systems is capable of dynamically and autonomously improving the performance of the regeneration based on the actual vehicle conditions and the actual driving condition. Thanks to the fact that the operations performed by the proposed filter regeneration system are based on threshold values that dynamically evolve based on the actual vehicle conditions and the actual driving condition instead that based on fixed threshold values, the proposed filter regeneration system may be advantageously installed in whichever type of vehicle without having to drastically modify the system itself for fitting the features of specific vehicles.

On this regards, another advantage provided by the proposed solutions is that the filter regeneration system herein described needs very few additional hardware resources to be installed on the vehicle, being necessary only the addition of a filter regeneration apparatus including the temperature sensor after the DPF, an input lid structure provided with glow plugs directly contacting the DPF input base, and an electronic control unit (the pressure sensor being normally already mounted in all the vehicles including a particulate filter).

In view of the above, the proposed filter regeneration system may be advantageously installed in whichever vehicle type, without having to drastically modify the fabrication process of the vehicle itself.

In order to further improve the efficiency of the proposed filter regeneration system, it may be possible to use upper limits for both the instantaneous pressure PRi and the average pressure PRm during the check performed by the control unit 160 for assessing if activating or not the glow plugs GLP (i.e., the check performed in block 445).

Particularly, the condition on the instantaneous pressure PRi of the block 445 can be modified so as its value has to remain within an interval defined by the minimum instantaneous pressure LPRi and a maximum instantaneous pressure HPRi (higher threshold) for the time interval Δt(P). Said maximum instantaneous pressure HPRi may be used for preventing the activation of the glow plugs GLP in particular conditions wherein it would be scarcely useful, for example in a highway condition wherein even after relatively high peaks in the instantaneous pressure PRi, the flow FLin of exhaust gas remains high (condition unfavorable for the combustion of the PM) because the engine works at high RPM.

Moreover, the condition on the average pressure PRm of the block 445 can be modified so as its value has to fall in a range defined by the minimum average pressure LPRm and a maximum average pressure HPRm (higher threshold), wherein said maximum average pressure HPRm may be set, for example, to the minimum alarm average pressure LAPRm. In this way, if the average pressure PRm exceeds said maximum average pressure HPRm, it means that the DPF 125 includes too much PM, and an emergency regeneration needs to be performed.

Even if in the present description reference has been made to a system for regenerating particulate filters that filter the PM emissions generated by a diesel engine, the concepts of the present invention can be applied to other types of engines, like the gasoline ones.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, the control unit may be adapted to vary, when in operation, the value of one or both of the percentiles used for setting the minimum and maximum instantaneous temperatures, so as to even better fit the expected driving condition of the vehicle 100.

The invention claimed is:

1. A filter regeneration system for controlling regeneration of a particulate filter adapted to filter particulate matter present in exhaust emissions of an engine of a vehicle, comprising:
   a control unit programmed to enable activation of a heating device of the particulate filter for causing heating thereof;
   at least one sensor in communication relationship with the control unit operatively coupled to the particulate filter for sensing at least one operating parameter thereof,
   wherein the control unit is programmed to:
   receive data relating to the at least one sensed operating parameter from the at least one sensor;
   condition activation of the heating device based on a comparison of the received data with at least one respective threshold;
   adjust a value of said at least one threshold based on an operating condition of the vehicle, said operating condition being detected based on the received sensed data;
   keep a collection of last received data; and
   determine said value of the at least one threshold based on a statistical analysis of the data in said collection,
   wherein said statistical analysis is performed by obtaining a statistical distribution of the data in the collection; and said value of the at least one threshold is determined based on a predetermined percentile of said statistical distribution.

2. The filter regeneration system of claim 1, wherein the control unit is programmed to:
   assess a result of a filter regeneration based on received data after the filter regeneration has occurred; and
   adjust a value of said at least one threshold based on the assessed result.

3. The filter regeneration system of claim 1, wherein said at least one sensor comprises at least one temperature sensor and at least one pressure sensor, and
   wherein said at least one temperature sensor and said at least one pressure sensor are coupled to said particulate filter for sensing a temperature and a pressure, respectively, of exhaust emissions produced by said vehicle engine.

4. The filter regeneration system of claim 3, wherein said at least one temperature sensor is arranged to sense the temperature of the exhaust emission at an exit from the particulate filter.

5. The filter regeneration system of claim 3, wherein said at least one pressure sensor is arranged to sense a pressure of the exhaust emission at an entrance into the particulate filter.

6. The filter regeneration system of claim 1, wherein the control unit is programmed to condition the activation of the heating device based on a comparison of received data of at least one of the following:
   instantaneous temperature of exhaust emissions produced by said vehicle engine,
   instantaneous pressure of exhaust emissions produced by said vehicle engine, and
   average pressure of exhaust emissions produced by said vehicle engine in a predetermined time period,
   with the at least one respective threshold.

7. The filter regeneration system of claim 6, wherein the control unit is programmed to condition the activation of the heating device based on a comparison of received data of the exhaust emissions instantaneous pressure with a lower instantaneous pressure threshold.

8. The filter regeneration system of claim 7, wherein the control unit is programmed to:
   keep a collection of more recent received data of the exhaust emissions instantaneous pressure; and
   determine a value of the lower instantaneous pressure threshold based on a statistical analysis of the data in said collection,
   wherein said statistical analysis comprises obtaining a statistical distribution of the data in the collection, and a value of the lower instantaneous pressure threshold is determined based on a third predetermined percentile of said statistical distribution at least higher than a 90% percentile of said statistical distribution.

9. The filter regeneration system of claim 6, wherein the control unit is programmed to condition the activation of the heating device based on a comparison of received data relating to the average pressure of the exhaust emissions in said predetermined time period with a lower average pressure threshold.

10. The filter regeneration system of claim 9, wherein the control unit is programmed to:
    assess the result of a filter regeneration based on the data relating to said average pressure after filter regeneration has occurred; and adjust a value of said lower average pressure threshold based on the assessed result,
wherein assessment of the result of a filter regeneration based on the data of the exhaust emissions average pressure comprises assessing if the average pressure of the exhaust emissions in a subsequent predetermined time period after the filter regeneration is lower than the lower average pressure threshold.

11. The filter regeneration system of claim 10, wherein the control unit is programmed to:
quantify a number of successful regenerations and a number of unsuccessful regenerations based on assessed results of successive filter regenerations, and
increase the lower average pressure threshold by a first amount if said number of unsuccessful regenerations has reached a first predetermined limit or decrease the lower average pressure threshold by a second amount if said number of successful regenerations has reached a second predetermined limit.

12. The filter regeneration system of claim 11, wherein values of said first and second amounts depend on the difference between the value of the exhaust emissions average pressure after the filter regeneration and the value of the lower average pressure threshold.

13. The filter regeneration system of claim 6, wherein the control unit is programmed to condition the activation of the heating device based on a comparison of received data of said instantaneous temperature with a lower instantaneous temperature threshold and a higher instantaneous temperature threshold.

14. The filter regeneration system of claim 13, wherein the value of the lower instantaneous temperature threshold is not lower than a minimum temperature required for performing the regeneration of the particulate filter, and the value of the higher instantaneous temperature threshold is not higher than a maximum temperature for which the regeneration of the particulate filter is self-performed without the need of the activation of the heating device.

15. The filter regeneration system of claim 13, wherein the control unit is programmed to condition the activation of the heating device if:
received data of said instantaneous temperature falls in an interval defined by a lower instantaneous temperature threshold and a higher instantaneous temperature threshold,
the received data of said instantaneous pressure is higher than the lower instantaneous pressure, and
the received data of said average pressure is higher than the lower average pressure.

16. The filter regeneration system of claim 13, wherein the control unit is programmed to:
keep a collection of last received data of the instantaneous temperature of the exhaust emissions of said vehicle engine; and
determine a value of at least one of the lower instantaneous temperature threshold and the higher instantaneous temperature threshold based on a statistical analysis of the data in said collection,
wherein said statistical analysis is performed by obtaining a statistical distribution of the data in the collection.

17. The filter regeneration system of claim 16, wherein the control unit is programmed to determine said value of at least one of the lower instantaneous temperature threshold and the higher instantaneous temperature threshold based on at least one predetermined percentile of said statistical distribution.

18. The filter regeneration system of claim 17, wherein the at least one predetermined percentile is a single predetermined percentile, the control unit programmed to set the lower instantaneous temperature threshold to a first value depending on the single percentile and the higher instantaneous temperature threshold to a second value depending on the single percentile.

19. The filter regeneration system of claim 18, wherein said first value is a first percentile of said statistical distribution depending on the single percentile and said second value is a second percentile of said statistical distribution depending on the single percentile.

20. The filter regeneration system of claim 17, wherein the control unit is programmed to set the value of the lower instantaneous temperature threshold on the basis of a first predetermined percentile of said statistical distribution.

21. The filter regeneration system of claim 20, wherein said first predetermined percentile corresponds to a percentile at least higher than a 70th percentile of a first statistical distribution of received data related to an operating condition of the vehicle being unfavorable for the regeneration of the particulate filter.

22. The filter regeneration system of claim 21, wherein said first predetermined percentile corresponds to a percentile at least higher than a 95th percentile of a first statistical distribution of received data related to an operating condition of the vehicle being unfavorable for the regeneration of the particulate filter.

23. The filter regeneration system of claim 17, wherein the control unit is programmed to set the value of the higher instantaneous temperature threshold on the basis of a second predetermined percentile of said statistical distribution.

24. The filter regeneration system of claim 23, wherein said second predetermined percentile corresponds to a percentile at least lower than a 45th percentile of a second statistical distribution of received data related to an operating condition of the vehicle being favorable for the regeneration of the particulate filter.

25. The filter regeneration system of claim 24, wherein said second predetermined percentile corresponds to a percentile at least lower than a 30th percentile of a second statistical distribution of received data related to an operating condition of the vehicle being favorable for the regeneration of the particulate filter.

26. A filter system for filtering particulate matter present in exhaust emissions of an engine of a vehicle, comprising:
a particulate filter for receiving the exhaust emission from the vehicle engine;
a heating device adapted to heat the particulate matter in the particulate filter when the heating device is activated, and
a filter regeneration system according to claim 1, for controlling regeneration of the particulate filter by enabling activation of the heating device for causing the heating thereof.

27. The filter system of claim 26, wherein the particulate filter is a SiC filter having a honeycomb structure.

28. The filter system of claim 26, wherein the heating device comprises glow plugs directly contacting the particulate filter.

29. A method of controlling regeneration of a particulate filter adapted to filter particulate matter present in exhaust emissions of an engine of a vehicle, the particulate filter being coupled to a heating device adapted to be activated so as to cause heating of the particulate filter, comprising:
sensing at least one operating parameter of the particulate filter;
receiving sensed data relating to the at least one sensed operating parameter;

comparing the received sensed data with at least one respective threshold to determine if said threshold is met;

activating the heating device to regenerate said particulate filter if said threshold is met; and adjusting a value of said at least one threshold based on an operating condition of the vehicle, said operating condition being detected based on received sensed data, wherein receiving sensed data comprises keeping a collection of last received data, and adjusting a value of said at least one threshold comprises determining said value of the at least one threshold based on a statistical analysis of data in said collection, and wherein said statistical analysis is performed by obtaining a statistical distribution of the data in the collection, and said value of the at least one threshold is determined based on a predetermined percentile of said statistical distribution.

30. The method of claim 29, wherein adjusting a value of said at least one threshold comprises:

assessing a result of a filter regeneration based on received data after the filter regeneration has occurred; and adjusting a value of said at least one threshold based on the assessed result.

31. The method of claim 29, wherein sensing at least one operating parameter comprises sensing a temperature and a pressure of exhaust emissions produced by said vehicle engine.

32. The method of claim 31, wherein said temperature is sensed at an exit of the exhaust emission from the particulate filter.

33. The method of claim 31, wherein said pressure is sensed at an entrance of the exhaust emission into the particulate filter.

34. The method of claim 29, wherein comparing the received sensed data with at least one respective threshold to determine if said threshold is met is based on a comparison of received data of at least one of the following:

instantaneous temperature of exhaust emissions produced by said vehicle engine, instantaneous pressure of exhaust emissions produced by said vehicle engine, and average pressure of exhaust emissions produced by said vehicle engine in a predetermined time period, with the at least one respective threshold.

35. The method of claim 34, wherein comparing the received sensed data with at least one respective threshold to determine if said threshold is met is based on a comparison of received data of the exhaust emissions instantaneous pressure with a lower instantaneous pressure threshold.

36. The method of claim 35, further comprising:

keeping a collection of more recent received data of the exhaust emissions instantaneous pressure; and determining a value of the lower instantaneous pressure threshold based on a statistical analysis of data in said collection, wherein said statistical analysis comprises obtaining a statistical distribution of the data in the collection, and a value of the lower instantaneous pressure threshold is determined based on a third predetermined percentile of said statistical distribution at least higher than a 90% percentile of said statistical distribution.

37. The method of claim 34, wherein comparing the received sensed data with at least one respective threshold to determine if said threshold is met is based on a comparison of received data relating to the average pressure of the exhaust emissions in said predetermined time period with a lower average pressure threshold.

38. The method of claim 37, further comprising:

assessing the result of a filter regeneration based on the data relating to said average pressure after filter regeneration has occurred; and adjusting a value of said lower average pressure threshold based on the assessed result, wherein said assessing the result of a filter regeneration based on the data of the exhaust emissions average pressure comprises assessing if the average pressure of the exhaust emissions in a subsequent predetermined time period after the filter regeneration is lower than the lower average pressure threshold.

39. The method of claim 38, further comprising:

quantifying a number of successful regenerations and a number of unsuccessful regenerations based on assessed results of successive filter regenerations; and increasing the lower average pressure threshold by a first amount if said number of unsuccessful regenerations has reached a first predetermined limit or decreasing the lower average pressure threshold by a second amount if said number of successful regenerations has reached a second predetermined limit.

40. The method of claim 39, wherein values of said first and second amounts depend on a difference between the value of the exhaust emissions average pressure after the filter regeneration and the value of the lower average pressure threshold.

41. The method of claim 34, wherein comparing the received sensed data with at least one respective threshold to determine if said threshold is met comprises comparing received data of said instantaneous temperature with a lower instantaneous temperature threshold and a higher instantaneous temperature threshold.

42. The method of claim 41, wherein the value of the lower instantaneous temperature threshold is not lower than a minimum temperature required for performing the regeneration of the particulate filter, and the value of the higher instantaneous temperature threshold is not higher than a maximum temperature for which the regeneration of the particulate filter is self-performed without a need of the activation of the heating device.

43. The method of claim 41, wherein comparing the received sensed data with at least one respective threshold to determine if said threshold is met comprises activating the heating device if:

received data of an instantaneous temperature falls in an interval defined by a lower instantaneous temperature threshold and a higher instantaneous temperature threshold, the received data of said instantaneous pressure is higher than the lower instantaneous pressure threshold, and the received data of said average pressure is higher than the lower average pressure.

44. The method of claim 41, further comprising:

keeping a collection of last received data of the instantaneous temperature of the exhaust emissions of said vehicle engine; and determining said value of at least one among the lower instantaneous temperature threshold and the higher instantaneous temperature threshold based on a statistical analysis of data in said collection, wherein said statistical analysis is performed by obtaining a statistical distribution of the data in the collection.

45. The method of claim 44, wherein determining said value of at least one of the lower instantaneous temperature threshold and the higher instantaneous temperature threshold is performed based on at least one predetermined percentile of said statistical distribution.

46. The method of claim 45, wherein the at least one predetermined percentile is a single predetermined percentile, and wherein determining of said value of at least one of the lower instantaneous temperature threshold and the higher instantaneous temperature threshold comprises setting the lower instantaneous temperature threshold to a first value depending on the single percentile and the higher instantaneous temperature threshold to a second value depending on the single percentile.

47. The method of claim 46, wherein said first value is a first percentile of said statistical distribution depending on the single percentile and said second value is a second percentile of said statistical distribution depending on the single percentile.

48. The method of claim 45, further comprising setting the value of the lower instantaneous temperature threshold on a basis of a first predetermined percentile of said statistical distribution.

49. The method of claim 48, wherein said first predetermined percentile corresponds to a percentile at least higher than a 70th percentile of a first statistical distribution of received data related to an operating condition of the vehicle being unfavorable for the regeneration of the particulate filter.

50. The method of claim 49, wherein said first predetermined percentile corresponds to a percentile at least higher than a 95th percentile, of a first statistical distribution of received data related to an operating condition of the vehicle being unfavorable for the regeneration of the particulate filter.

51. The method of claim 45, further comprising setting the value of the higher instantaneous temperature threshold on a basis of a second predetermined percentile of said statistical distribution.

52. The method of claim 51, wherein said second predetermined percentile corresponds to a percentile at least lower than a 45th percentile of a second statistical distribution of received data related to an operating condition of the vehicle being favorable for the regeneration of the particulate filter.

53. The method of claim 52, wherein said second predetermined percentile corresponds to a percentile at least lower than a 30th percentile of a second statistical distribution of received data related to an operating condition of the vehicle being favorable for the regeneration of the particulate filter.

* * * * *